United States Patent
Gage

(10) Patent No.: US 10,820,192 B2
(45) Date of Patent: Oct. 27, 2020

(54) DOWNLINK TRANSMISSION IN A RAN INACTIVE MODE

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/986,070

(22) Filed: May 22, 2018

(65) Prior Publication Data

US 2018/0368196 A1    Dec. 20, 2018

Related U.S. Application Data

(60) Provisional application No. 62/520,899, filed on Jun. 16, 2017.

(51) Int. Cl.
*H04W 8/00* (2009.01)
*H04W 76/28* (2018.01)
(Continued)

(52) U.S. Cl.
CPC ......... *H04W 12/001* (2019.01); *H04L 9/0816* (2013.01); *H04L 9/3236* (2013.01);
(Continued)

(58) Field of Classification Search
CPC . H04L 63/08; H04L 27/2613; H04L 27/2602; H04L 9/0816; H04L 2209/80;
(Continued)

(56) References Cited

U.S. PATENT DOCUMENTS

2015/0043435 A1* 2/2015 Blankenship ......... H04L 69/322
370/329
2017/0034853 A1* 2/2017 Rune .................... H04W 68/02
(Continued)

FOREIGN PATENT DOCUMENTS

CN        105898894 A      8/2016
CN        106658758        5/2017
(Continued)

OTHER PUBLICATIONS

3GPP TS 38.321 V0.0.4 (Jun. 2017) "NR; Medium Access Control (MAC) protocol specification".
(Continued)

*Primary Examiner* — Moo Jeong

(57) ABSTRACT

A network node of a Radio Access network (RAN) is configured for delivering downlink data to a user equipment (UE) operating in an inactive mode. The network node receives, via a network interface, downlink data destined for the UE and constructs a downlink protocol data unit (PDU) comprising the downlink data. The network node identifies a set of one or more target nodes within a RAN notification area, and transmits the downlink PDU and an inactive mode identifier associated with the UE to the identified set of target nodes using UE context information associated with the UE. One or more of the target nodes forwards the downlink PDU to the UE using delivery information provided by the network node.

19 Claims, 16 Drawing Sheets

(51) Int. Cl.
  *H04W 76/19*    (2018.01)
  *H04W 76/12*    (2018.01)
  *H04W 76/11*    (2018.01)
  *H04W 74/00*    (2009.01)
  *H04W 72/04*    (2009.01)
  *H04W 68/04*    (2009.01)
  *H04W 28/16*    (2009.01)
  *H04W 12/04*    (2009.01)
  *H04W 12/00*    (2009.01)
  *H04L 9/32*     (2006.01)
  *H04L 9/08*     (2006.01)
  *H04L 29/06*    (2006.01)
  *H04L 27/26*    (2006.01)

(52) U.S. Cl.
  CPC ...... *H04L 27/2613* (2013.01); *H04L 63/0428* (2013.01); *H04L 63/08* (2013.01); *H04W 12/0051* (2019.01); *H04W 12/0401* (2019.01); *H04W 28/16* (2013.01); *H04W 74/006* (2013.01); *H04W 76/11* (2018.02); *H04W 76/12* (2018.02); *H04W 76/28* (2018.02); *H04L 27/2602* (2013.01); *H04L 2209/80* (2013.01); *H04W 8/005* (2013.01); *H04W 72/042* (2013.01)

(58) Field of Classification Search
  CPC ............. H04L 9/3236; H04L 63/0428; H04W 74/006; H04W 72/042; H04W 8/005; H04W 12/04; H04W 76/11; H04W 76/12; H04W 28/16; H04W 76/28; H04W 12/001; H04W 12/0051; H04W 68/04
  See application file for complete search history.

(56) References Cited

U.S. PATENT DOCUMENTS

2018/0097606 A1* 4/2018 Toledano .............. H04L 1/1861
2018/0206227 A1   7/2018 Jiang
2018/0227851 A1* 8/2018 Kubota ............ H04W 52/0229
2018/0234839 A1   8/2018 Tenny et al.
2018/0234894 A1   8/2018 Jiang
2019/0082490 A1   3/2019 Zhang et al.

FOREIGN PATENT DOCUMENTS

CN    106714315        5/2017
EP    2557889 A1       2/2013

OTHER PUBLICATIONS

3GPP TS 38.322 V0.0.2 (May 2017) "NR; Radio Link Control (RLC) protocol specification".
3GPP TS 38.323 V0.1.0 (Jun. 2017) "NR; Packet Data Convergence Protocol (PDCP) specification".
3GPP TS 38.401 V0.1.0 (May 2017) "NG-RAN; Architecture description".
3GPP TS 38.413 V0.1.0 (May 2017) "NG-RAN; NG Application Protocol (NGAP)".
3GPP TS 38.423 V0.1.1 (Jun. 2017) "NG-RAN; Xn application protocol (XnAP)".
3GPP TR 38.804 V1.0.0 (Mar. 2017) " Study on New Radio Access Technology; Radio Interface Protocol Aspects".
3GPP TS 36.300 V14.2.0 (Mar. 2017) "Evolved Universal Terrestrial Radio Access Network (E-UTRAN); Overall description".
3GPP TS 36.321 V14.2.1 (Mar. 2017) "Evolved Universal Terrestrial Radio Access Network (E-UTRAN); Medium Access Control (MAC) protocol specification".
R3-162482 Qualcomm Incorporated,"Paging and mobility procedures in light connection",3GPP TSG-RAN WG3 Meeting #93bis-,Sophia Antipolis, France, Oct. 10-14, 2016,total 5 pages.
R3-170081 LG Electronics Inc.,"Functionality support for the UE in inactive mode",3GPP TSG-RAN WG3 Meeting #NR Ad-hoc,Spokane, Washington, USA, Jan. 17-19, 2017,total 3 pages.
R3-171130 LG Electronics Inc.,"Discussion on inter-gNB mobility in RRC_INACTIVE",3GPP TSG-RAN WG3 Meeting #95bis-,Spokane, Washington, USA, Apr. 3-7, 2017,total 4 pages.

* cited by examiner

| MAC element 1 | Flags | Type = Control | CE type |
|---|---|---|---|
| | (MAC CE from serving RAN node) | | |

Figure 13A

| MAC element 2 | Flags | Type = Control | CE type |
|---|---|---|---|
| | (MAC CE from anchor RAN node) | | |

Figure 13B

| MAC element 3 | Flags | Type = Data | LCID | 1302 |
|---|---|---|---|---|
| | Length of Data PDU | | 1304 | |
| | RLC Header | | 1306 | |
| | PDCP Data PDU | PDCP Header | | 1308 |
| | | SDAP Header | | |
| | | PDCP Data | | |

Figure 13C

DOWNLINK TRANSMISSION IN A RAN INACTIVE MODE

CROSS-REFERENCE TO RELATED APPLICATIONS

This application is based on, and claims benefit of, U.S. provisional patent application No. 62/520,899 filed Jun. 16, 2017, the entire content of which is hereby incorporated herein by reference.

FIELD OF THE INVENTION

The present invention generally pertains to the field of wireless communications networks, and particular embodiments or aspects relate to downlink transmission to user equipment operating in a RAN inactive mode of operation.

BACKGROUND

In a conventional radio access network (RAN), a user equipment (UE) may be operating in any one of a connected mode, an idle mode, and an inactive mode. The connected mode of operation corresponds with bi-directional connectivity between the UE and its serving base stations, such that the UE is able to send and receive session protocol data units. The idle mode corresponds with no connectivity between the UE and the RAN, for example due to the UE being powered down, or having its radio resources turned off (i.e. in "airplane" mode). The inactive mode is similar to the idle mode in that there is no connectivity between the UE and the RAN, but also differs from the idle mode in that at least one RAN node retains UE context information (such as security association, encryption keys etc.), and so is capable of initiating communication with the UE in a relatively short period of time.

The inactive mode of operation allows a UE to enter a low energy mode of operation, and thereby conserve battery power. In order to receive information transmitted by the network, the UE must transition into a connected mode. However a transition from an inactive mode to a connected mode results in one or more of the following:

moving UE context across a backhaul network to the new serving RAN node from an anchor RAN node;
 creating a new security association between the UE and the new serving RAN node and deriving new cryptographic keys;
 control plane signalling over the radio link to configure the UE for operation within the new serving cell.

These operations result in additional latency and extended periods of time when the UE is not able to re-enter a low energy mode of operation due to the required interaction with the serving RAN node. In a case in which the downlink transmission involves a small amount of data, such as a single IP packet, the signalling overheads may be much larger than the amount of user data being transmitted to the UE. As a consequence, the conventional procedure for delivery of small amounts of downlink data may result in a significant consumption of battery power by the UE. This is particularly problematic for machine-type communications (MTC) devices that sporadically transmit and receive small amounts of data and must operate for extended periods of time without a battery recharge.

Accordingly, there may be a need for a system and method for downlink transmission to a UE operating in a RAN inactive mode that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Accordingly, an aspect of the present invention provides a method at a network node of a radio access network (RAN) for delivering downlink data to a user equipment (UE) operating in an inactive mode, the method comprising: receiving, via a network interface of the network node, a downlink protocol data unit (PDU) comprising a user equipment identifier and the downlink data; identifying a set of one or more target nodes within a RAN notification area using stored UE context information associated with the UE, and transmitting the downlink data to the identified set of target nodes, to instruct each target node to transmit the downlink data to the UE.

In some embodiments, each one of the set of one or more target nodes is configured to control communication within at least one cell of the RAN.

In some embodiments, identifying the set of one or more target nodes comprises: identifying cells of the RAN in which the UE may be located, based on the stored UE context information; and selecting nodes of the RAN configured to control communication within the identified cells as target nodes.

In some embodiments, the stored UE context information associated with the UE comprises information identifying a RAN notification area associated with the UE, and wherein identifying the set of one or more target nodes comprises selecting nodes of the RAN configured to control communication within the identified RAN notification area as target nodes.

In some embodiments, the stored UE context information associated with the UE comprises cryptographic keys. In such cases, transmitting the downlink data to the identified set of target nodes may comprise cryptographically securing the downlink data based on the cryptographic keys; and transmitting the cryptographically secured downlink data to the identified set of target nodes.

In specific embodiments, cryptographically securing the downlink data may comprise either one or both of: encrypting the downlink data, and computing a message integrity check value.

In specific embodiments, the delivery instructions comprises a user device identifier associated with the UE, and instructing each target node to transmit the downlink data to the UE comprises instructing each target node to: transmit, in a first downlink transmission, a paging notification comprising a user device identifier, a preamble identifier, and an ephemeral device identifier associated with the user device identifier; receive, in a first uplink transmission, a preamble associated with the preamble identifier; and transmit, in a second downlink transmission, the downlink data in association with the ephemeral device identifier.

A further aspect of the present invention provides a network function comprising: a network interface configured to receive data from and transmit data to other network functions connected to a network; one or more processors; and at least one non-transient computer readable memory storing software instructions configured to control the one or more processors to deliver downlink data to a user equipment (UE) operating in an inactive mode, by: receiving, via the network interface, a downlink PDU comprising a user equipment identifier and the downlink data; identifying a set of one or more target nodes within a RAN notification area of the network using stored UE context information associated with the UE; and transmitting the downlink data and delivery instructions to the identified set of target nodes, to instruct each target node to transmit the downlink data to the UE.

A further aspect of the present invention provides a network function comprising: a network interface configured to receive data from and transmit data to other network functions connected to a network; one or more processors; a radio receiver configured to receive data through a radio link; a radio transmitter configured to transmit data through the radio link; and at least one non-transient computer readable memory storing software instructions configured to control the one or more processors to deliver downlink data to a user equipment (UE) operating in an inactive mode, by: receiving, via the network interface, a data delivery request comprising a the downlink data and delivery instructions including a user device identifier associated with the UE; transmitting via the radio transmitter a paging notification comprising the user device identifier, a preamble identifier, and an ephemeral device identifier associated with the user device identifier; receiving via the radio receiver a preamble associated with the preamble identifier; and transmitting via the radio transmitter the user downlink data in association with the ephemeral device identifier.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some embodiments of the present invention may provide methods and systems by which data may be delivered to a User Equipment operating in an Inactive mode, without requiring the User Equipment to transition from the Inactive mode to the to a connected state. This may provide a reduction in the consumption of battery power by the UE.

BRIEF DESCRIPTION OF THE FIGURES

Further features and advantages of the present invention will become apparent from the following detailed description, taken in combination with the appended drawings, in which:

FIGS. 13A-C illustrate respective example MAC elements usable in embodiments of the present invention;

DETAILED DESCRIPTION

Figure 1:
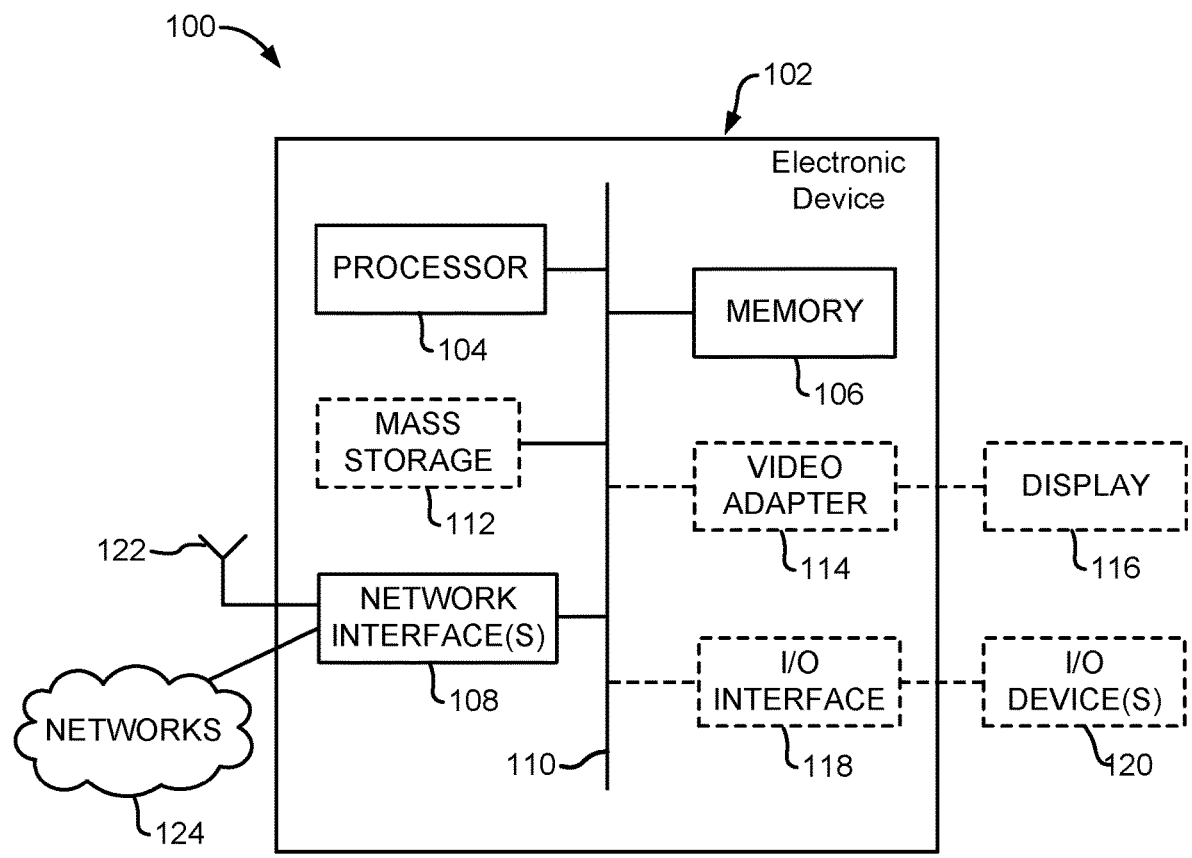
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device may be an element of communications network infrastructure, such as a base station (for example a NodeB, an evolved Node B (eNodeB or eNB), a next generation NodeB (gNB or ng-eNB), a home subscriber server (HSS), a gateway (GW) such as a user plane gateway (UPGW), a packet gateway (PGW) or a serving gateway (SGW) or various other nodes or functions within a public land mobile network (PLMN). In other embodiments, the electronic device may be a device that connects to the network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (M2M) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 104, such as a central processing unit (CPU), and may further include specialized processors such as a graphics processing unit (GPU) or other such processor, a memory 106, a network interface 108 and a bus 110 to connect the components of ED 102. ED 102 may optionally also include components such as a mass storage device 112, a video adapter 114, and an I/O interface 118 (shown in dashed lines).

The memory 106 may comprise any type of non-transitory system memory, readable by the processor 104, such as static random access memory (SRAM), dynamic random access memory (DRAM), synchronous DRAM (SDRAM), read-only memory (ROM), or a combination thereof. In an embodiment, the memory 106 may include more than one type of memory, such as ROM for use at boot-up, and DRAM for program and data storage for use while executing programs. The bus 110 may be one or more of any type of several bus architectures including a memory bus or memory controller, a peripheral bus, or a video bus.

The electronic device 102 may also include one or more network interfaces 108, which may include at least one of a wired network interface and a wireless network interface. As illustrated in FIG. 1, network interface 108 may include a wired network interface to connect to a network 124, and also may include a radio access network interface 122 for connecting to other devices over a radio link. When ED 102 is part of the network infrastructure, the radio access network interface 122 may be omitted for nodes or functions acting as elements of the PLMN that are not at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 108 allow the electronic device 102 to communicate with remote entities such as those connected to network 124.

The mass storage 112 may comprise any type of non-transitory storage device configured to store data, programs, and other information and to make the data, programs, and other information accessible via the bus 110. The mass storage 112 may comprise, for example, one or more of a solid state drive, hard disk drive, a magnetic disk drive, or an optical disk drive. In some embodiments, mass storage 112 may be remote to the electronic device 102 and accessible through use of a network interface such as interface 108. In the illustrated embodiment, mass storage 112 is distinct from memory 106 where it is included, and may generally perform storage tasks compatible with higher latency, but may generally provide lesser or no volatility. In some embodiments, mass storage 112 may be integrated with a heterogeneous memory 106.

The optional video adapter 114 and the I/O interface 118 (shown in dashed lines) provide interfaces to couple the electronic device 102 to external input and output devices. Examples of input and output devices include a display 116 coupled to the video adapter 114 and an I/O device 120 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and video adapter 114 may be virtualized and provided through network interface 108.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources.

Figure 2:
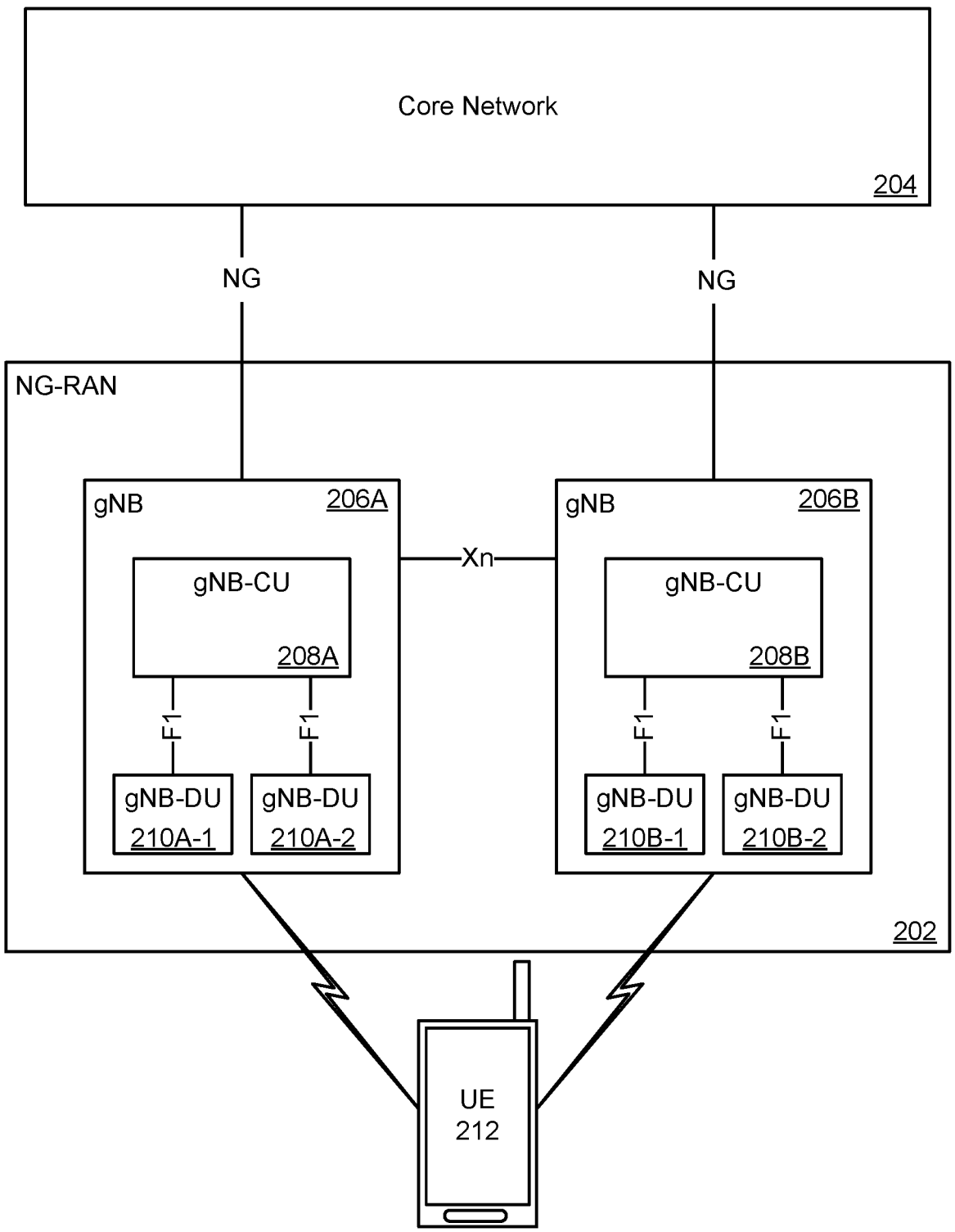
FIG. 2 is a block diagram illustrating an example architecture of a 5G radio access network.

FIG. 2 illustrates a proposed architecture 200 for the implementation of a 5G next generation radio access network (NG-RAN) 202. NG-RAN 202 is the radio access network that connects an ED 102 to a core network 204. Those skilled in the art will appreciate that core network 204 may be a 5G Core Network or a 4G Evolved Packet Core (EPC) network. Nodes within NG-RAN 202 connect to the 5G Core Network 204 over an NG interface. This NG interface can comprise both a control plane NG-C(N2) interface to a CN control plane function (CPF) and a user plane NG-U (N3) interface to a CN user plane function (UPF). NG-RAN 202 includes a plurality of radio access nodes where each node is referred to as a next generation NodeB (gNB or ng-eNB). In the NG-RAN 202, gNB 206A and gNB 206B are able to communicate with each other over an Xn interface. Within a single gNB 206A, the functionality of the gNB may be decomposed into a centralized unit (gNB-CU) 208A and a set of distributed units (gNB-DU 210A-1 and gNB-DU 210A-2, collectively referred to as 210A). gNB-CU 208A is connected to a gNB-DU 210A over an F1 or similar interface. Similarly gNB 206B has a gNB-CU 208B connecting to a set of distributed units gNB-DU 210B-1 and gNB-DU 210B. Each gNB-DU may be responsible for one or more cells providing radio coverage within the PLMN.

A gNB is also connected to user equipment 212 (UE— such as, for example electronic device 102) via a radio link (Uu) and to another gNB via an Xn interface that includes both a control plane component (Xn-C) and a user plane component (Xn-U).

A UE 212 may establish multiple PDU sessions with the CN 204 where different sessions may correspond to different instances of the NG-U user plane interface; each instance of the NG-U interface may terminate on a different CN user plane entity.

In an LTE system, similar interfaces exist: an evolved NodeB (eNB) is connected to a CN through an S1 interface and to another eNB through an X2 interface. Throughout this document, the term "RAN node" is used to refer a radio access network element that encompasses gNB, gNB-CU, gNB-DU, eNB, ng-eNB, NodeB, base station, and other forms of radio access controller. The term "RAN node" may also be understood in some contexts to include other wireless access nodes, such as WiFi access points, in which case suitable modifications to adapt to a different standard may be required.

It should be understood that any or all of the functions discussed above with respect to the NG-RAN 202 may be virtualized within a network, and the network itself may be provided as a network slice of a larger resource pool.

Figure 3:
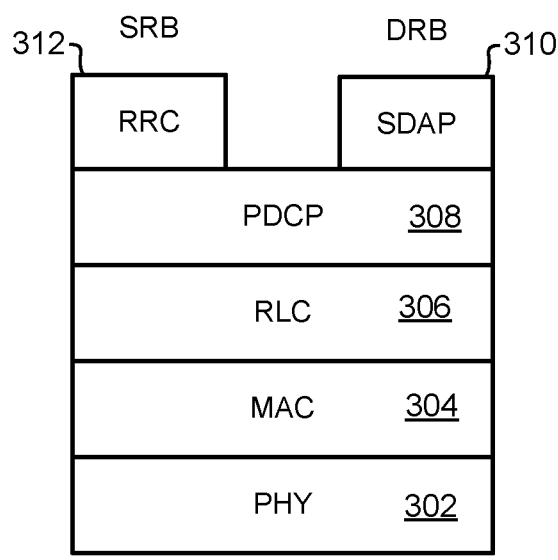
FIG. 3 is a block diagram illustrating an example radio link protocol stack usable in embodiments of the present invention.

Referring to FIG. 3, the Uu interface between a UE 212 and a RAN node 206 may comprise several entities within the protocol stack. Example entities include:
- physical layer (PHY) 302—which encodes information for transmission over the radio link.
- medium access control (MAC) layer 304—which performs scheduling of radio resources according to traffic demands, multiplexing of MAC PDUs belonging to one or different logical channels onto PHY transport blocks, and error correction through hybrid automatic repeat requests (HARQ).

radio link control (RLC) layer 306—which performs segmentation and reassembly of RLC PDUs for mapping onto PHY transport blocks, and provides error recovery through automatic repeat requests (ARQ).

packet data convergence protocol (PDCP) layer 308—which performs header compression and decompression for IP packets, in-sequence delivery of upper layer PDUs, PDCP PDU routing for transmission, duplicate packet detection, retransmission of lost PDCP PDUs, cryptographic integrity protection and encryption.

service data adaptation protocol (SDAP) 310—which performs routing of QoS flows onto the appropriate data radio bearer. A QoS flow may comprise an aggregation of user plane traffic receiving the same forwarding treatment (e.g. scheduling policy, queue management policy, rate shaping policy, RLC configuration, PDCP configuration). Providing different QoS forwarding treatment requires a different QoS flow.

radio resource control (RRC) 312 performs configuration of radio resources assigned to a UE, configuration of radio bearers for information exchange, management of radio link security associations, paging, measurement reporting, handover, and transport for non-access stratum (NAS) signalling.

Control plane information such as RRC and NAS signalling may be carried over a signalling radio bearer (SRB) while user plane data may be carried over a data radio bearer (DRB).

Figures 4A, 4B:
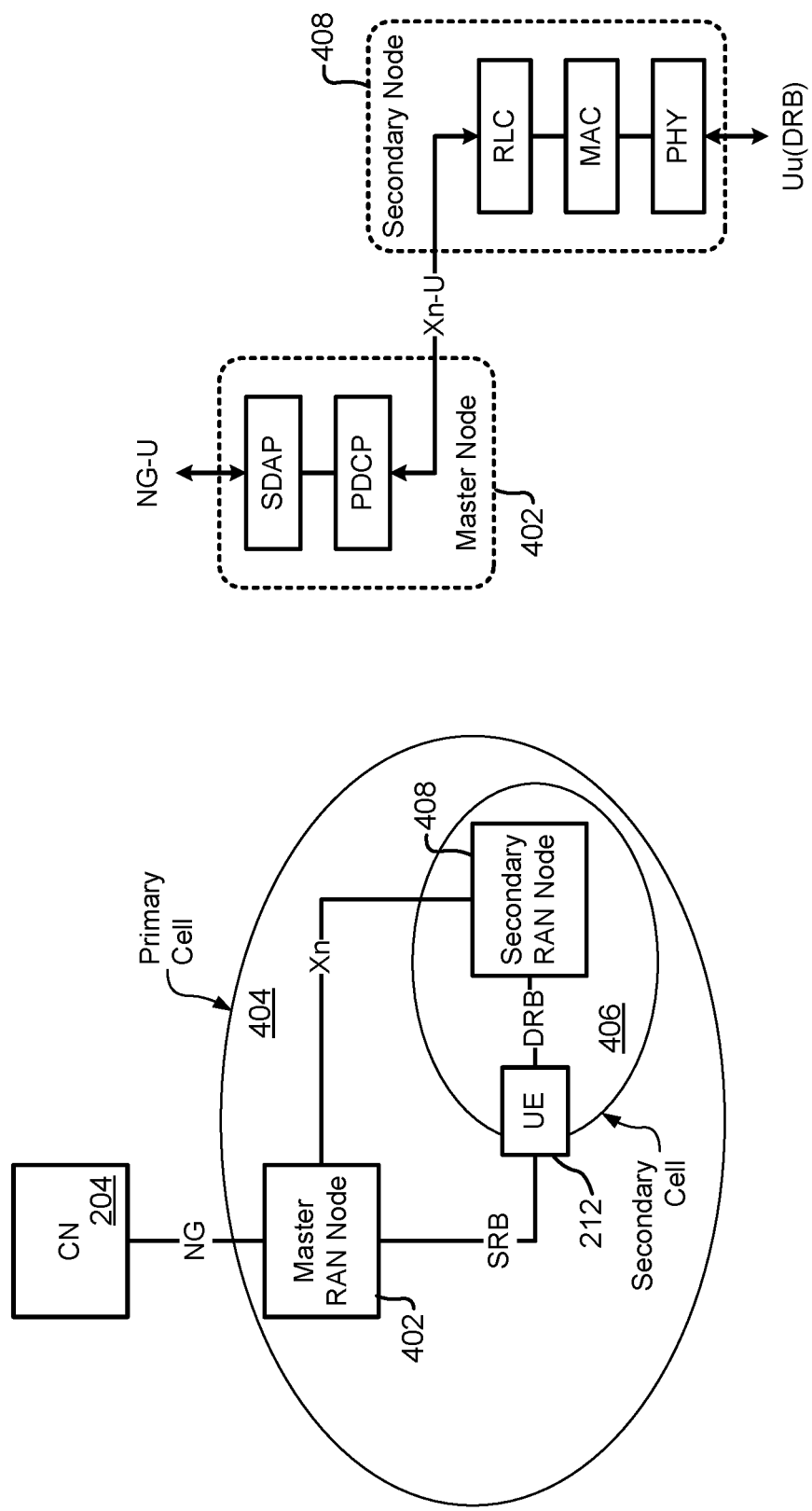
FIG. 4A is a block diagram illustrating dual connectivity.
FIG. 4B is a block diagram illustrating a protocol stack for the dual connectivity of FIG. 4A.

In some networks, a number of small cells may be deployed within the coverage area of a macro cell to offload traffic from the macro cell and/or to provide improved signal quality to UEs. FIG. 4A shows an example deployment in which a master RAN node 402 provides the NG connections to the core network 204 and maintains a signalling radio bearer (SRB) to a UE 212 through a primary cell 404. The UE 212 may use a data radio bearer (DRB) to convey user plane traffic through a secondary cell 406 to a secondary RAN node 408. This traffic may be relayed between the master and the secondary RAN nodes 402,408 over an Xn interface.

On the network side, the user plane protocol stack in a dual connectivity deployment may be split between the master RAN node 402 and the secondary RAN node 408, as may be seen in FIG. 4B. The master RAN node 402 houses the upper layer protocol stack entities (including SDAP 310 and PDCP 308) while the secondary RAN node 408 houses the lower layer protocol stack entities (RLC 306, MAC 304 and PHY 302).

While the UE 212 is registered with the network, it may transition between multiple modes of operation, including:

connected mode. In this mode, the UE 212 maintains radio bearers with the RAN in order to exchange user plane data with servers connected to the Internet-at-large.

idle mode. In this mode, the UE 212 may remain registered with the CN but there are no RAN resources associated with the UE 212. As a result, the UE 212 is not connected to the RAN and cannot transmit or receive information.

inactive mode. In this mode, there are no radio resources associated with the UE 212 but the RAN maintains a context for the UE 212 that encompasses the security keys established during authentication of the UE 212 and the configuration parameters associated with all sessions that have been established for the UE 212. The inactive mode allows a UE 212 to enter a low energy mode of operation, similar to idle mode, in order to conserve battery power but allows a quick transition to connected state in order to transmit and receive information. In some embodiments, an inactive mode may be referred to as RRC_INACTIVE.

The inactive mode allows a UE 212 to enter a low energy mode of operation, similar to the idle mode, in order to conserve battery power. Conventionally, a UE 212 must transition into a connected mode of operation in order to receive information transmitted by the network. However a transition from an inactive to connected mode may result in one or more of the following:

moving UE 212 context across a backhaul network to a new serving RAN node from an anchor RAN node;

creating a new security association between the UE 212 and a new serving RAN node and deriving new cryptographic keys;

control plane signalling over the radio link to configure the UE 212 for operation within a new serving cell.

These operations result in additional latency and extended periods of time when the UE 212 is not able to re-enter a low energy mode of operation due to the required interaction with the serving RAN node. In a case in which the downlink transmission involves a small amount of data, such as a single IP packet, the signalling overheads may be much larger than the amount of user data being transmitted to the UE 212. As a consequence, the conventional procedure for delivery of small amounts of downlink data may result in a significant consumption of battery power by the UE 212. This is particularly problematic for machine-type communications (MTC) devices that sporadically transmit and receive small amounts of data and must operate for extended periods of time without a battery recharge.

The teaching of this disclosure addresses this problem by providing methods and systems in which an anchor RAN node associated with a UE 212 operating in inactive mode may attempt to deliver downlink data (such as a downlink PDU) to the UE 212 without transitioning the UE 212 to a connected mode of operation and without moving UE 212 context to a possibly new serving RAN node. In particular, the use of RRC signalling may be avoided and all of the upper layer protocol procedures (e.g. PDCP, SDAP, session management) provided by an anchor node so that downlink transmission at the serving RAN node only involves lower layer protocol procedures (PHY, MAC and RLC). The PDCP security association between the UE 212 and the anchor RAN node is maintained thereby avoiding the overhead of generating new cryptographic keys at the serving node.

Keeping the UE 212 in an inactive mode reduces radio link signalling overheads and results in commensurate battery power savings in the UE 212. Keeping the UE 212 context in the anchor RAN node also reduces latencies and overheads.

Because upper layer protocol (e.g. PDCP) operations are performed in the anchor RAN node while lower layer protocol (e.g. RLC) operations are performed in the serving RAN node, these procedures affect operations over the Uu (radio link) layer 2 interface as well as over the terrestrial interface between RAN nodes (e.g. Xn/X2).

Figure 5:
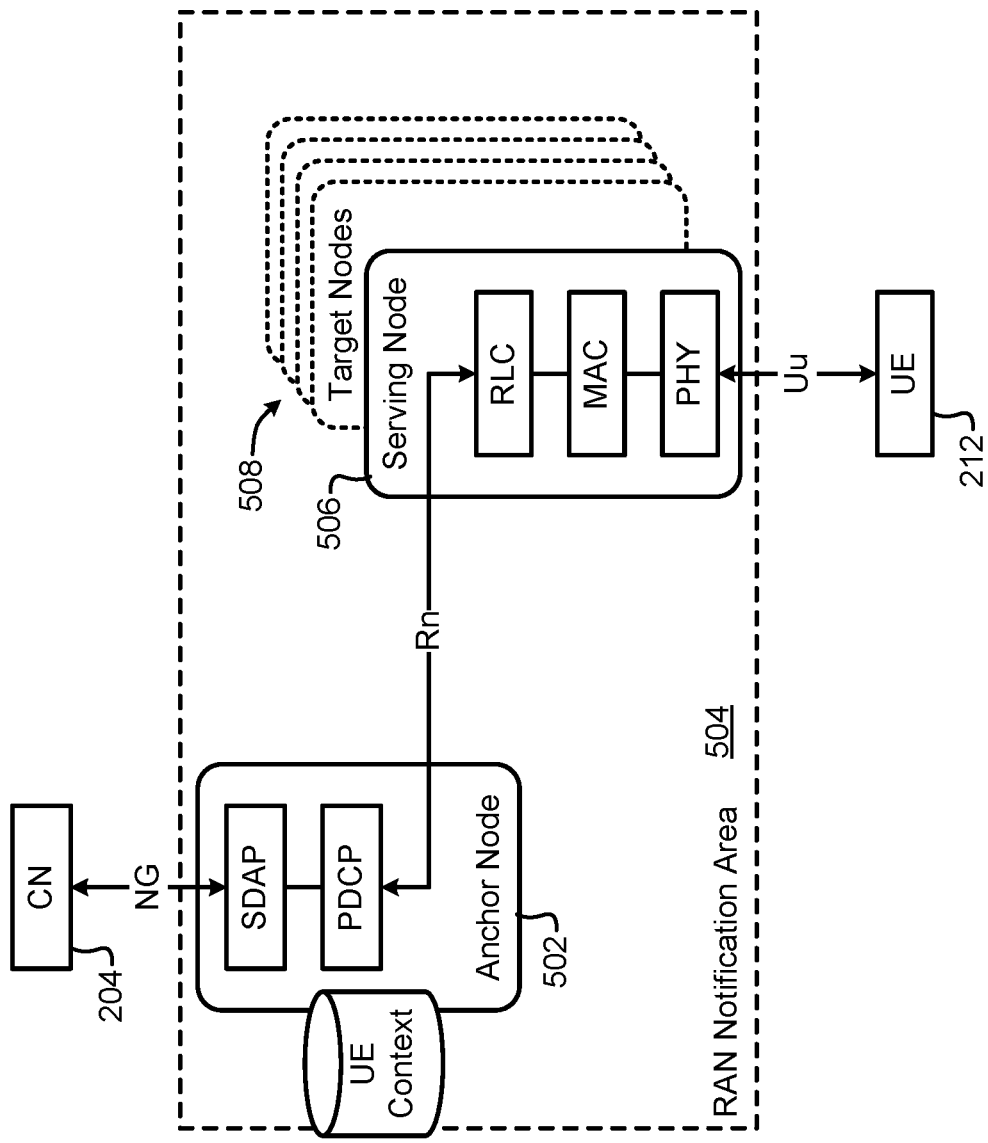
FIG. 5 is a block diagram illustrating an example functional system architecture usable in embodiments of the present invention.

FIG. 5 illustrates an example radio access network model for inactive mode operations. In this example RAN model:

a RAN anchor node 502 maintains the connections to the core network (CN) 204 for the UE 212 (e.g. NG or S1). The RAN anchor node 502 also maintains, or has access to, the current configuration and other contextual information associated with the UE 212. In some embodiments, the RAN anchor node 502 may be a node that previously acted as a serving node of the UE 212, for example when the UE 212 entered the inactive mode. In other embodiments, the RAN anchor node 502 may be a centralised server configured to act as an anchor node for multiple UEs within the PLMN.

a RAN notification area (RNA) 504 denotes one or more cells in which the UE 212 can receive service while roaming within the PLMN; the scope of the RNA 504 may be as small as a single cell or as large as the entire PLMN. If the UE 212 roams outside the designated RNA 504, it may notify the RAN and may be assigned to a different anchor node.

the RAN anchor node 502 may be connected via an intra-RAN backhaul network to one or more other RAN nodes 506 within the RNA 504; each of those RAN nodes 506 may control one or more cells associated with the RNA 504. The interface between RAN nodes 502 and 506, dubbed Rn in FIG. 5, may be provided as any one or more of an X2 interface, an Xn interface, a CU-DU interface, or a new interface (which may be similar to any of the X2, Xn or CU-DU interfaces) developed for the purpose.

The example protocol stack illustrated in FIG. 5 is based on the dual-connectivity model shown in FIG. 4B. Accordingly, the upper layer SDAP and PDCP protocol entities and state machines are located in the RAN anchor node 504, while the lower layer RLC, MAC and PHY protocol entities and state machines are located in the RAN serving node 506. However, in contrast to the dual-connectivity model, the serving node 506 does not have access to the UE-specific context for managing transmissions over the radio link (Uu) to the UE 212. For example, the serving node 506 may not have any one or more of:

configurations for radio bearers currently established for this UE 212 (i.e. RLC configuration, PDCP configuration);

radio bearer state information (e.g. received PDU sequence numbers, transmitted PDU sequence numbers);

robust header compression state information (e.g. established flow contexts, flow sequence number);

cryptographic keying material (e.g. keys, counters) for this UE 212;

QoS information (e.g. authorised QoS profiles, SDAP QoS flow to DRB mappings);

session information (e.g. identity of CN UPF, identity of CN CPF).

The lack of radio link protocol information implies that the serving node 506 must have procedures tailored for use in inactive mode.

Figure 6:
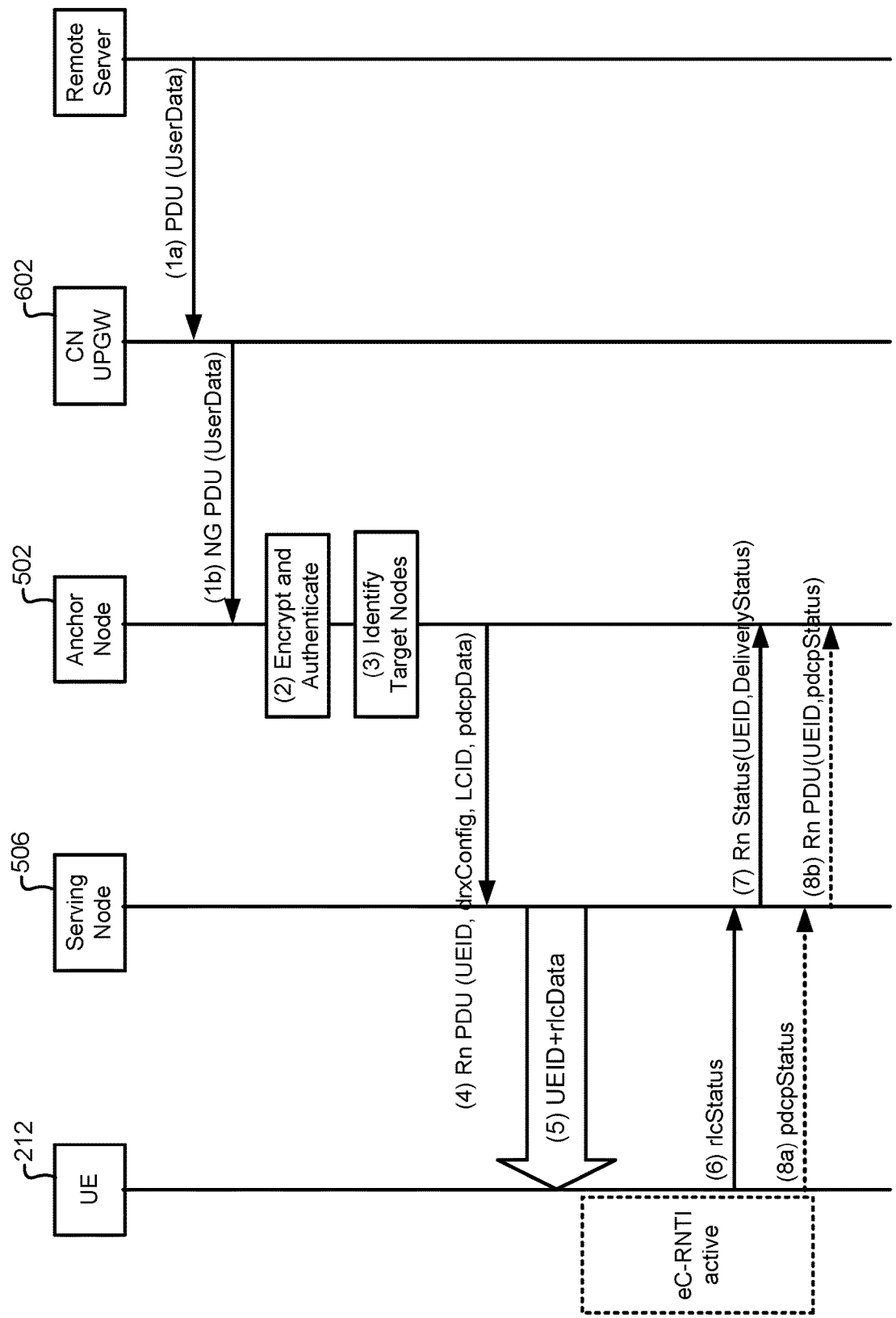
FIG. 6 is a signal flow diagram illustrating a process for inactive mode downlink transmission in accordance with an example embodiment of the present invention.

FIG. 6 is a flow diagram illustrating principal steps in an example procedure for inactive mode downlink data transmission to a UE 212. The example process includes the following steps:

Step 1: A downlink user data packet is received by a Core Network user plane gateway (UPGW) 602 that is associated with (an IP address assigned to) the UE 212. Based on current session configuration, the user data packet is encapsulated in an NG tunnel PDU and forwarded to the RAN node that is currently serving as the mobility anchor for this (session of the) UE 212. This node may be referred to as the RAN anchor node 502, or simply the anchor node 502.

an RAN anchor node 502 maintains a user plane (e.g. NG-U) connection to a UPGW for each PDU session currently established for the UE 212; the user plane connection is used for exchanging session-related traffic between the CN 204 and RAN 202.

an anchor node 502 also maintains, or has access to, UE-specific context that is used by the RAN for supporting services provided to the UE 212 by the MNO. The context includes session information, DRB and SRB configuration, SRB and DRB/LCID parameters (e.g. sequence numbers) and cryptographic keying material (e.g. keys, counters).

in most cases when a UE 212 is operating in an inactive mode, the anchor node 502 will be a RAN node that previously served the UE 212, however it may be some other network node (e.g. a mobility anchor point or some other centralised unit) serving one or more RAN nodes.

Step 2: If the anchor node 502 determines that an inactive mode delivery should be attempted, it constructs a downlink data PDU by encrypting the received user data packet and optionally adding an authenticated message integrity check using the cryptographic keying information from the stored UE 212 context. The downlink data PDU may also include upper layer 2 (PDCP and SDAP) protocol headers.

Step 3: The UE 212 context includes an inactive mode RAN notification area (RNA 504) currently assigned to the UE 212. From the RNA 504 configuration and, optionally, from available UE 212 mobility information, the anchor node 502 derives a set of target RAN nodes 508 that may have cells encompassed by the RNA 504. The coverage provided by cells controlled by the target nodes 508 selected by the anchor node 502 may be larger or smaller than the nominal coverage area of the RNA 504. Similarly, the set of target nodes 508 may include all of the nodes of the RNA 504, or a subset of the nodes of the RNA 504. For example, the anchor node 502 may use available UE 212 mobility information to derive a set of target nodes 508 that control cells in which the UE 212 is expected to be located, based on any suitable criteria.

Step 4: The anchor node 502 sends the downlink data PDU across the intra-RAN (Rn) network to each of the target RAN nodes 508. The downlink data PDU is encapsulated in an Rn PDU that also includes at least the following information:

a UE identifier (UEID) that uniquely identifies the UE 212 within the RAN notification area;

the LCID to be used for delivery of the PDCP PDU over the radio link.

Step 5: Each of the target nodes 508 attempts to deliver the downlink data PDU to the target UE 212 using the paging and/or transmission occasions indicated by the anchor node 502.

When the UE 212 responds to the page in its current serving cell, the involved target node 508 assumes the role of the serving RAN node 506 and may assign an ephemeral cell-specific radio network temporary identifier (C-RNTI) to the UE 212 to coordinate contention-free transmissions between the UE 212 and the serving node 506. The ephemeral C-RNTI is associated with the UE 212 for a short period of time and is automatically released through expiration of a timer or through conclusion of the inactive transmission procedure.

Step 6: If the UE 212 successfully receives the downlink transmission, and if a reception acknowledgement was requested by the serving node 506, the UE 212 may transmit a lower layer 2 acknowledgement to the serving node 506.

Step 7: If a delivery acknowledgement was requested by the anchor node 502, the serving node 506 may send an Rn delivery acknowledgement to the anchor node 502, indicating the status of the attempted downlink transmission to the UE 212.

Step 8: If the UE 212 successfully receives the downlink data PDU, it decrypts and optionally authenticates the user data packet using its stored cryptographic keying material. If the user data packet is successfully authenticated and reconstructed, and if an acknowledgement was explicitly requested by the anchor node 502, the UE 212 may send an acknowledgement to the anchor node 502, via the serving node 506, indicating successful receipt of the downlink data PDU.

The forwarding of the downlink data PDU to the target RAN nodes 508 along with a paging request in step 4 is designed to:

- minimise packet delivery delay by avoiding an Rn round trip delay to fetch the data packet after receiving a page response at the serving node 506; and
- minimise the time that the UE 212 must spend out of its (low energy) inactive mode by minimising the time between the reception of a paging notification and the scheduling of a downlink transmission for the user data packet.

Operations at the Anchor RAN Node

If an anchor RAN node 502 receives a downlink user data packet and determines that an inactive mode delivery should be attempted, it may construct a downlink data PDU and forward the PDU to the set of target RAN nodes 508 within the RAN notification area 504 assigned to the UE 212. Similarly, if the anchor RAN node 502 decides to update the configuration of a UE 212 while it is in an inactive mode, the anchor node 502 may construct a control plane PDU (e.g. an RRC message) and forward the PDU to the set of target RAN nodes 508.

Each of the target nodes 508 may attempt to deliver the downlink PDU. At most, only one of the target nodes 508 will normally succeed and send a successful delivery acknowledgement to the anchor node 502. If the anchor node 502 fails to receive a successful delivery acknowledgement from any of the target RAN nodes 508, it may initiate a paging failure recovery procedure.

Downlink transmission at the serving RAN node 506 (that is, the target node 508 that is currently serving the UE 212) only involves lower layer radio link procedures (PHY, MAC and RLC); while upper layer procedures (e.g. PDCP, SDAP, session management) are provided by the anchor node 502.

UE Identifiers

A UE 212 may be assigned one or more identifiers for use while in inactive mode. Example identifiers may include:

- an inactive context identifier (e.g. I-RNTI or UEID) that identifies where the UE 212 context is located while the UE 212 is operating in an inactive mode. This identifier may be used, for example, by a serving RAN node 506 to locate and retrieve the UE 212 context (e.g. in order to return the UE 212 to a connected state) or to forward short UL PDUs to the anchor RAN node 502. This identifier may also be used to address the UE 212 in paging notifications transmitted within an assigned RAN notification area 504.
- a RAN paging identifier (e.g. pagingID) that may be used to address the UE 212 in paging notifications transmitted within an assigned RAN notification area 504. This identifier may also be used to compute default paging occasions if the UE 212 is not assigned a specific discontinuous reception (DRX) schedule. In some situations, the RAN paging identifier may be associated with a group of one or more UEs that includes the UE 212 associated with the UEID.
- a NAS identifier (e.g. nasID) that may be used to reference the UE 212 in control plane messages exchanged between the CN and RAN. This identifier may also be used to compute default paging occasions if the UE 212 is not assigned a specific DRX schedule or a specific RAN paging identifier. In some situations, this identifier may also be used to address the UE 212 in paging notifications transmitted within an assigned PLMN registration area.
- a cell-specific radio network temporary identifier (C-RNTI) that is used to reference the UE 212 in signalling messages exchanged between the UE 212 and a RAN node. This may include an RNTI assigned by an anchor node (aC-RNTI) and an ephemeral RNTI (eC-RNTI) assigned by a RAN node serving a UE 212 in inactive mode.

In some situations, one or more of these identifiers may be equivalent. For example, the RAN paging identifier may be the same as the NAS identifier. In other situations, one identifier may be incorporated into another identifier. For example, an anchor C-RNTI may be incorporated into an inactive context identifier.

PDCP and SDAP Operation in Anchor RAN Node

The UE 212 context maintained by the anchor RAN node 502 may include the following information:

- the cryptographic parameters currently associated with the UE 212 (e.g. cryptographic keys and algorithms);
- session configuration information (e.g. QoS profiles with QoS flow identifiers, UPGW information);
- RRC configuration parameters; and
- the PDCP sequence numbers currently associated with each LCID.

Based on the session and RRC configuration information, the anchor node may map the received downlink user data packet onto a data radio bearer (DRB) which, in turn, can be used to identify a particular PDCP configuration and context. Similarly, a downlink RRC message may be mapped onto a signalling radio bearer (SRB) with a particular PDCP configuration and context. In this context, both user plane packets and RRC messages may be considered to be PDCP data PDUs; the term "PDCP control PDU" refers to a separate PDCP status message that is exchanged between PDCP peer entities.

Figure 7:
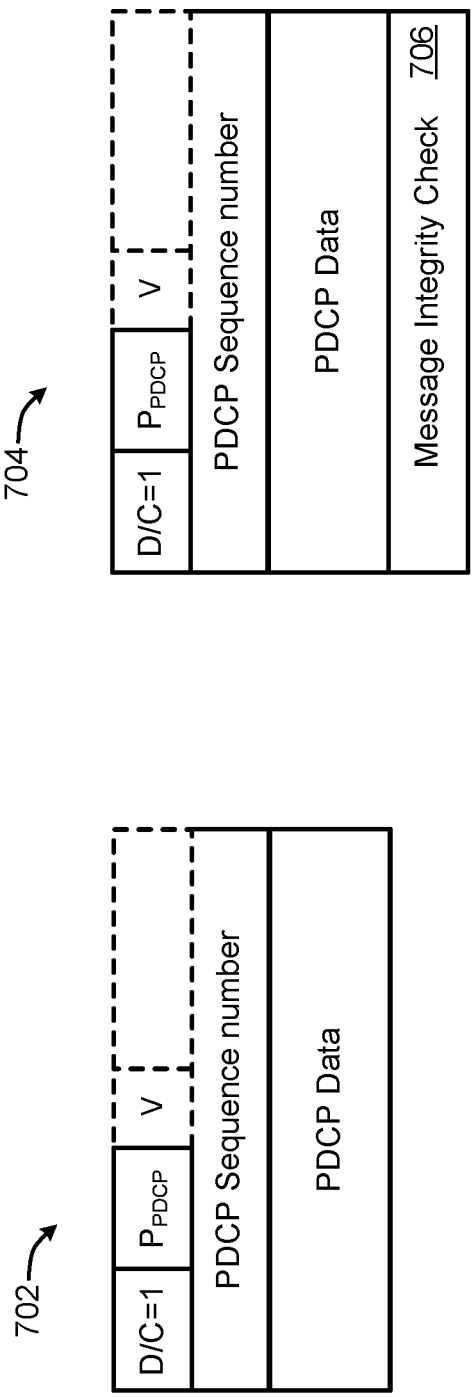
FIGS. 7A and 7B illustrate respective example PDCP data PDUs usable in the embodiment of FIG. 6.

FIGS. 7A and 7B illustrate example PDCP data PDUs 702 and 704, which differ only in that the PDCP data PDU of FIG. 7B includes a message integrity check value (also known as an integrity message authentication code, MAC-I) 706. The anchor node may construct the downlink PDCP data PDU using the next valid PDCP sequence number for the selected radio bearer:

- if the UE 212 has been configured for robust header compression (for the current LCID), the anchor node may compress the header contained in the user data packet using the current state of the header compression stream.
- if the UE 212 has been configured for encryption (for the current LCID), the anchor node may encrypt the PDCP data using the configured cryptographic parameters and the PDCP sequence number.
- if the UE 212 has been configured for message integrity check (for this LCID), the anchor node may compute the integrity check value using the configured cryptographic parameters and append it to the PDCP data PDU, as may be seen in FIG. 7B.

the anchor node may set a poll request (e.g. $P_{PDCP}=1$) if it requires acknowledgement from the UE 212 that the downlink PDCP data PDU was successfully received and authenticated. If an acknowledgement is requested (e.g. $P_{PDCP}=1$), the anchor node may also set a verification request (e.g. V=1) if the UE 212 should also include a message integrity check with the acknowledgement. A verification request may not be required if the UE 212 is configured to provide a message integrity check with every PDCP control PDU.

Forwarding to Target RAN Nodes Over Rn

The RAN notification area (RNA 504) identifies where a UE 212 can receive service while operating in an inactive mode. A UE 212 may be assigned a RAN notification area before entering an inactive mode and may report its location either periodically while remaining within the RNA 504, or whenever it moves outside of its assigned RNA 504.

Figure 8:
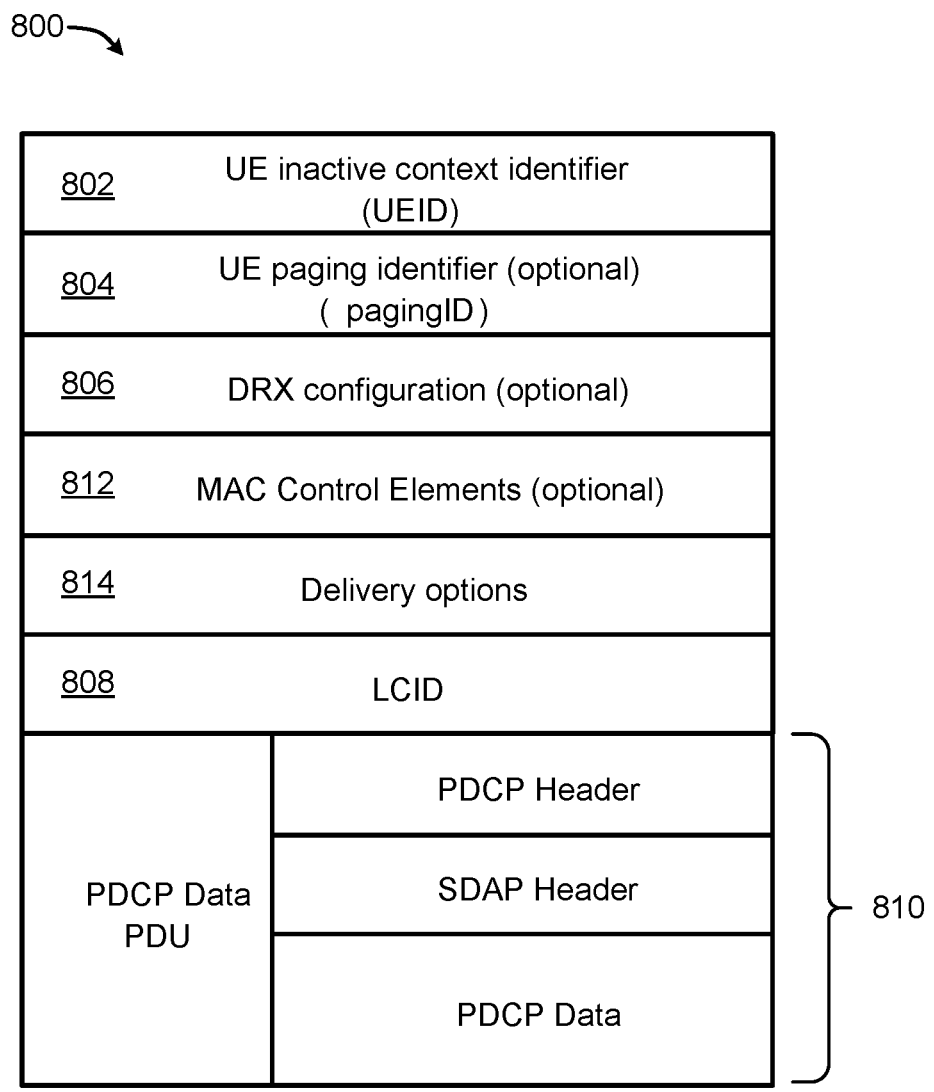
FIG. 8 illustrates an example Rn downlink data PDU usable in the embodiment of FIG. 6.

When the anchor RAN node 502 has constructed a downlink PDCP data PDU, it may use the RNA 504 configuration and, optionally, available UE 212 mobility information to determine the set of target RAN nodes encompassing one or more cells of the RNA 504 and then send a copy of the PDCP data PDU to each of the target nodes. The PDCP data PDU may be encapsulated in an Rn PDU. FIG. 8 illustrates an example Rn PDU 800, which may include the following information:

- the inactive context identifier (I-RNTI or UEID) 802 associated with the UE 212;
- a RAN paging identifier (pagingID) 804 associated with the UE 212 if different from the UEID;
- an optional DRX configuration 806 indicating configured opportunities for transmission to the UE 212 that may be used for delivery of the downlink PDU. If provided, these configured downlink transmission opportunities are used rather the default opportunities derived from the pagingID or UEID.
- the LCID 808 selected by the anchor node for delivery of the PDCP data PDU
- a set of delivery options 814 that may include one or more of the following:
  - the identity of cells within the target RAN node 508 that comprise (part of) the RAN notification area associated with the UE 212;
  - the RLC mode configured for the designated LCID (e.g. assured mode or un-assured mode);
  - an indication of whether the target RAN node should provide a delivery status report to the anchor RAN node 502 for a successful and/or unsuccessful delivery attempt.
- the upper layer data 810 comprising a PDCP data PDU for delivery to the UE 212, including:
  PDCP header;
  SDAP header;
  PDCP data comprising the encrypted, authenticated and/or compressed upper layer packet.
- optional MAC control elements 812; this may include, for example, a new UEID to be used with subsequent inactive mode procedures.

Recovery from RAN Paging Failure

After the anchor RAN node 502 has forwarded the downlink PDU to each of the target nodes 508 within the RAN notification area 504 associated with the UE 212, the anchor node 502 may start a timer and waits for delivery status reports from one or more of the target nodes 508. If the timer expires before a delivery report is received, or if all target nodes 508 report a delivery failure, the anchor node 502 may initiate a paging failure recovery procedure that may include one or more of the following:

- repeating the paging request to a set of target RAN nodes 508, where the new set of target nodes may reduce the paging region to include a smaller number of target RAN nodes 508, or expand the paging region to include target RAN nodes 508 from the RNA 504 that were not included in the original set of target nodes, or expand the paging region to include RAN nodes that are outside the RNA 504 associated with the UE 212;
- forwarding a paging request to a CN CPF in order to page the UE 212 (using the RAN-assigned UEID or paging identifier and UE 212-specific DRX configuration) in RAN nodes that are not reachable by the anchor RAN node;
- forwarding a paging request to a CN 204 CPF in order to page the UE 212 (using a CN-assigned NAS identifier such as S-TMSI and a CN paging configuration) within the CN registration area associated with the UE 212;
- declaring the UE 212 to be in an idle mode, resulting in a removal of the UE 212 context from the RAN and a release of the corresponding NG connections to the CN 204.

Operations at the Serving RAN Node

When the downlink Rn PDU is received by a target RAN node 508, the target node 508 may determine whether or not the UE 212 is known to the target node 508. For example, if the UE 212 identified by the UEID was assigned an eC-RNTI during a previous procedure (e.g. uplink or downlink transmission of a previous data PDU) and the eC-RNTI assignment is still active, then the UE 212 is known to the target node 508. If so, the target node 508 may attempt to deliver the downlink PDU through a scheduled downlink transmission that avoids paging.

Otherwise, the target RAN node 508 may determine the next paging opportunity either directly from the DRX configuration, if provided by the anchor RAN node 502, or by deriving it from a paging identifier or UEID received from the anchor node 502. At the scheduled opportunity, the target node 508 may construct and broadcast a paging notification that may be addressed to the UEID or paging identifier supplied by the anchor node 502.

If a page response that includes the UEID or paging identifier is received from a UE 212, the now-serving RAN node 506 may attempt to deliver the downlink PDU and, if requested, report the delivery status to the anchor RAN node 502. If no page response is received, the target node 508 may silently discard the downlink PDU if the anchor node 502 did not request a delivery status for unsuccessful paging.

Downlink Transmission Variants

Figures 9A, 9B:
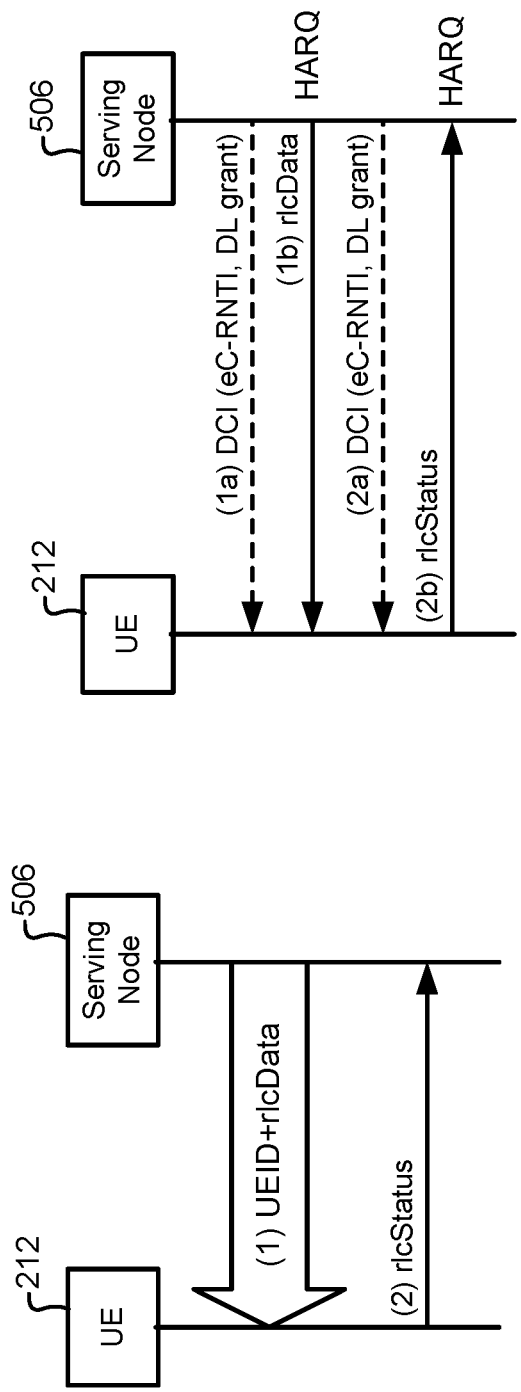
FIGS. 9A-9D illustrate respective example downlink transmission processes usable in the embodiment of FIG. 6.

FIGS. 9A-9D illustrate example downlink transmission variants. When the UE 212 responds to the paging notification in one of the target RAN nodes 508, that target node is then deemed to be the RAN serving node 506. At the serving node 506, delivery of the downlink PDU provided by the anchor RAN node 502 involves two stages as shown in FIG. 9A. In the first stage, the downlink PDU (consisting of the PDCP data PDU and, optionally, MAC control elements provided by the anchor node 502) is delivered to the target UE 212 using RLC and MAC procedures of the serving node 506. In some scenarios, HARQ may be used for recovery from transmission errors at the serving node 506. In an optional second stage, the UE 212 provides confirmation of receipt to the serving node 506 through an RLC status message. This stage is only executed if acknowledgement is specifically requested by the serving RAN node 506 or if the radio bearer RLC is configured for assured mode operation.

The downlink transmission procedure employed by the serving RAN node 506 for delivery of the downlink PDU depends on UE 212 capabilities signalled to the serving RAN node 506 by the anchor node 502 and on the UE 212 context, if any, maintained by the serving node 506. The manner in which the UE 212 receives the downlink transmission is different in each of the three procedures described below:

downlink transmission without paging;
downlink transmission with paging and a conventional 4-step RACH;
downlink transmission with paging and contention-free RACH.

Without Paging

The downlink PDU may be delivered to the target UE 212 without paging if the UE 212 has an ephemeral C-RNTI (eC-RNTI) currently assigned by the serving RAN node 506. That is, the UE 212 was assigned an eC-RNTI during transmission of a previous uplink or downlink PDU and the eC-RNTI assignment is still active. The serving node 506 may determine the assigned eC-RNTI by using the USD provided by the anchor node 502 in the Rn PDU to cross-reference a context accessible by the serving node 506.

A downlink data transmission without paging is shown in FIG. 9B and may follow a downlink grant procedure known, for example, from 3GPP TS 36.321, "Evolved Universal Terrestrial Radio Access Network (E-UTRAN); Medium Access Control (MAC) protocol specification". This process may include the following steps:

Step 1a: [DL] DCI (eC-RNTI, DL grant). The serving node 506 transmits a DL grant using a DCI encoded with the eC-RNTI assigned to the UE 212. Note that the timing of the grant may depend on a DRX cycle previously configured by the serving node 506 or by the anchor node 502.

Step 1b: [DL] The PDCP data PDU is transmitted using the radio resources designated by the assigned downlink grant.

Steps 2a and 2b: If the serving node 506 requested an RLC acknowledgement in step 1b or if the radio bearer RLC is configured for assured mode operation, a DCI containing an UL grant encoded with the eC-RNTI assigned to the UE 212 is provided for transmission of the RLC status report.

With Paging and 4-Step RACH

If the serving node 506 does not have a context for the target UE 212, or if the eC-RNTI assignment is no longer valid, the serving node 506 may page the UE 212 prior to delivery of the downlink PDU. A downlink data transmission using the paging and 4-step RACH procedure of FIG. 9C may follow a procedure similar to that known, for example, from 3GPP TS 36.300, "Evolved Universal Terrestrial Radio Access Network (E-UTRAN); Overall description; Stage 2". This procedure may include the following steps:

Step 1a: [DL] DCI (P-RNTI, DL grant). The serving node 506 transmits a DL grant using a DCI encoded with the pre-defined paging RNTI (P-RNTI). Note that the timing of the grant may depend on a paging opportunity derived from the identifier assigned to the target UE 212 by the anchor node 502 or may be explicitly provided by the anchor node 502 based on a pre-configured DRX cycle.

Figure 10:
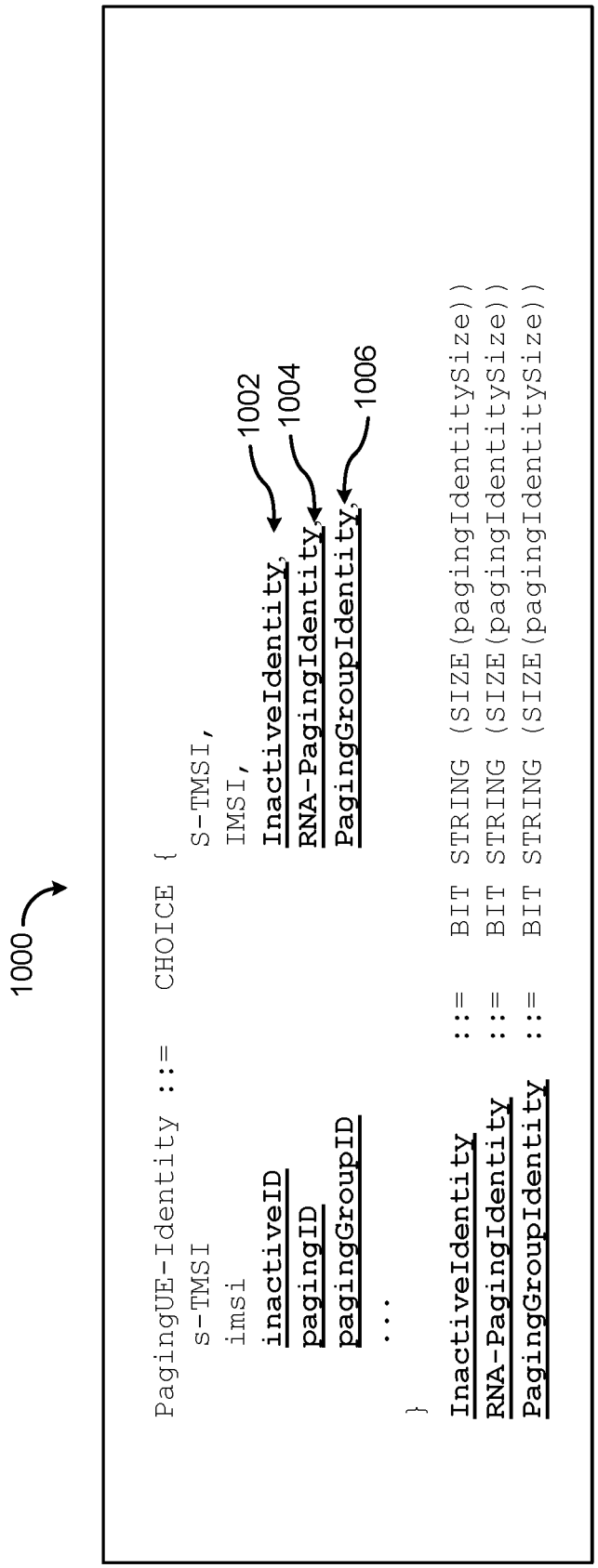
FIG. 10 illustrates an example PagingUE-Identity usable in the downlink transmission process of FIG. 9C.

Step 1b: [DL] Paging notification. The paging notification may be a paging message or other indication of the UE 212 (or group of UEs) being paged. For example, a paging message contains a list of paging records each of which identifies one of the UEs being sought. Note that this may require a new PagingUE-Identity to incorporate inactive mode UEIDs or other RNA-based paging identifiers. FIG. 10 illustrates an example PagingUE-Identity 1000 that incorporates an inactive mode USD 1002, an RNA-based paging identifier 1004 or a paging group identifier 1006.

Step 1c: [UL] preamble. If the UE 212 determines that the PagingUE-Identity in a paging record matches one of the identifiers assigned to the UE 212, the UE 212 initiates a random access procedure by arbitrarily selecting a random access preamble and transmitting the preamble in a scheduled physical random access channel (PRACH). Other UEs may have independently selected the same preamble for transmission in the PRACH.

Step 1d: [DL] DCI (DL grant, RA-RNTI). The serving node 506 transmits a DL grant using a DCI encoded with a predefined random access RNTI (RA-RNTI) that points to a region in the PDSCH that contains a random access response (RAR).

Step 1e: [DL] RAR (RAPID, eC-RNTI, UL grant). The RAR may contain a list of random access preamble identifiers (RAPIDs) corresponding to the preambles detected by the serving node 506 in the PRACH. For each RAPID, the serving node 506 may provide:

a temporary C-RNTI assignment that will be used by the UE 212 as the ephemeral C-RNTI (eC-RNTI);
an UL grant that may be used by the UE 212 to transmit its identity.

Step 1f: [UL] UEID. Using the UL grant, the UE 212 transmits its UEID (or other inactive mode identity) in a layer 2 PDU (such as a MAC control element) or in a layer 3 (RRC) information element:

when an individual UE 212 is paged, this would normally be the same identifier included in the paging message (step 1b), however it may be a different identifier associated with the UE 212 and provided to both the UE 212 and the serving RAN node 506 by the anchor node 502;
if a group of UEs is paged, this would be the UEID or another identifier associated with the UE 212.

Note that no other information (e.g. an RRC message) is required in this uplink transmission.

Step 1g: [DL] DCI (eC-RNTI, DL grant). If the serving node 506 successfully receives the UL transmission (i.e. the CRC included in the received transmission block is valid) and if the UEID indicated in step 1f matches an identifier received from the anchor RAN node 502, the serving node 506 transmits a DL grant using a DCI encoded with the eC-RNTI assigned to the UE 212 in step 1e.

If the serving node 506 does not receive a response from the target UE 212 (e.g. a transmission error may have occurred or the UE 212 may have entered an energy conservation mode of operation or moved outside the coverage area of the RAN node), it may repeat the paging procedure or (silently) abandon the delivery attempt.

Step 1h: [DL] UEID+RLC data PDU. When the UE 212 receives the DL transmission corresponding to the DL grant, it compares the identifier contained in the contention resolution identity MAC CE of the received message against its own UEID (i.e. the UEID transmitted in step 1f):

if there is a match, DL reception of the RLC data PDU containing the PDCP data PDU is deemed successful.
if there is not a match, DL reception of the RLC data PDU is deemed unsuccessful (e.g. another UE may have transmitted the same preamble in step 1c); the UE 212 may attempt to respond to the paging notification by repeating this procedure, starting at step 1c, at a later time.

Figure 9D:
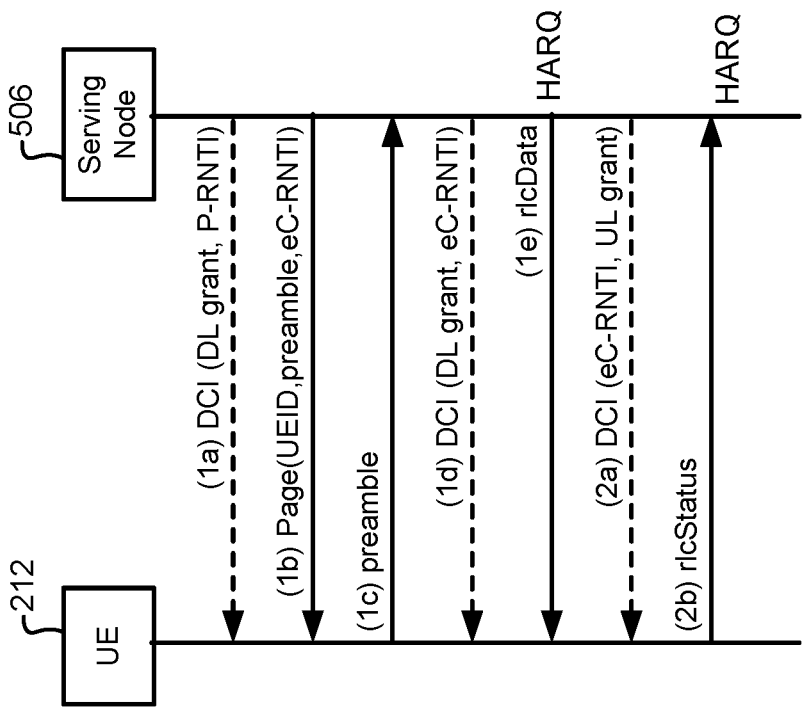
Figure 9C:
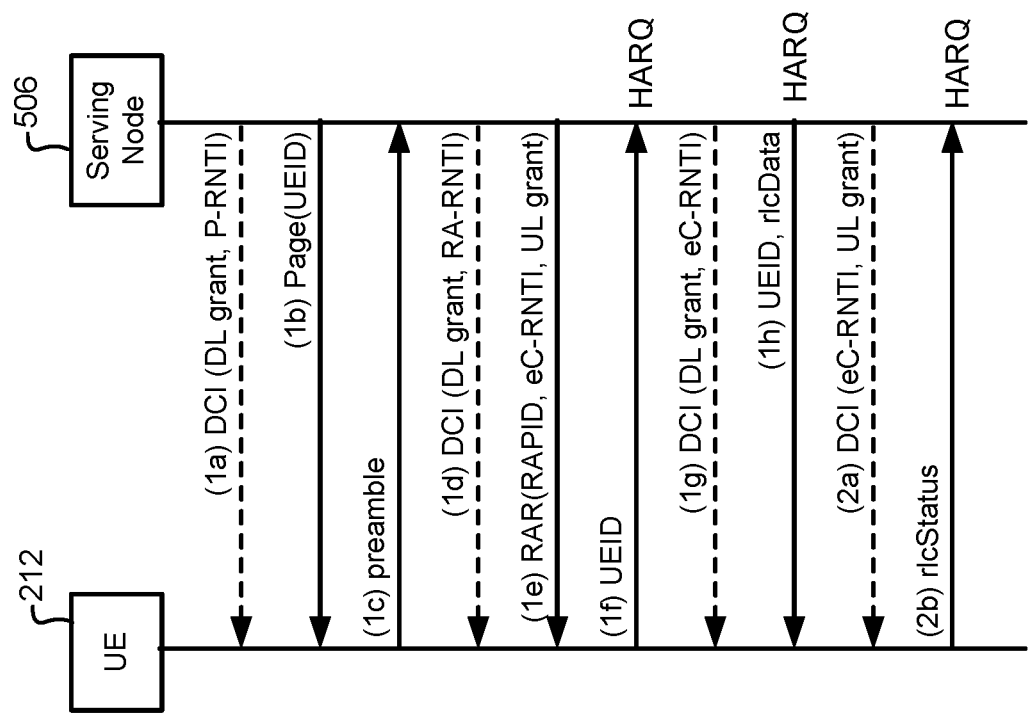

Steps 2a and 2b: If the serving node 506 requested an RLC acknowledgement in step 1h or if the radio bearer RLC is configured for assured mode operation, a DCI containing an UL grant encoded with the eC-RNTI assigned to the UE 212 is provided for transmission of the RLC status report.
With Paging and Contention-Free RACH If the serving node 506 does not have a context for the target UE 212, or if the eC-RNTI assignment is no longer valid, the serving node 506 may page the UE 212 prior to delivery of the downlink PDU. A downlink data transmission using a paging and contention-free RACH procedure is shown in FIG. 9D. This example process includes the following steps:

Step 1a: [DL] DCI (P-RNTI, DL grant). The serving node 506 transmits a DL grant using a DCI encoded with the pre-defined paging RNTI (P-RNTI). Note that the timing of the grant may depend on a paging opportunity derived from the identifier assigned to the target UE 212 by the anchor node 502 or may be explicitly provided by the anchor node 502 based on a pre-configured DRX cycle.

Figure 11:
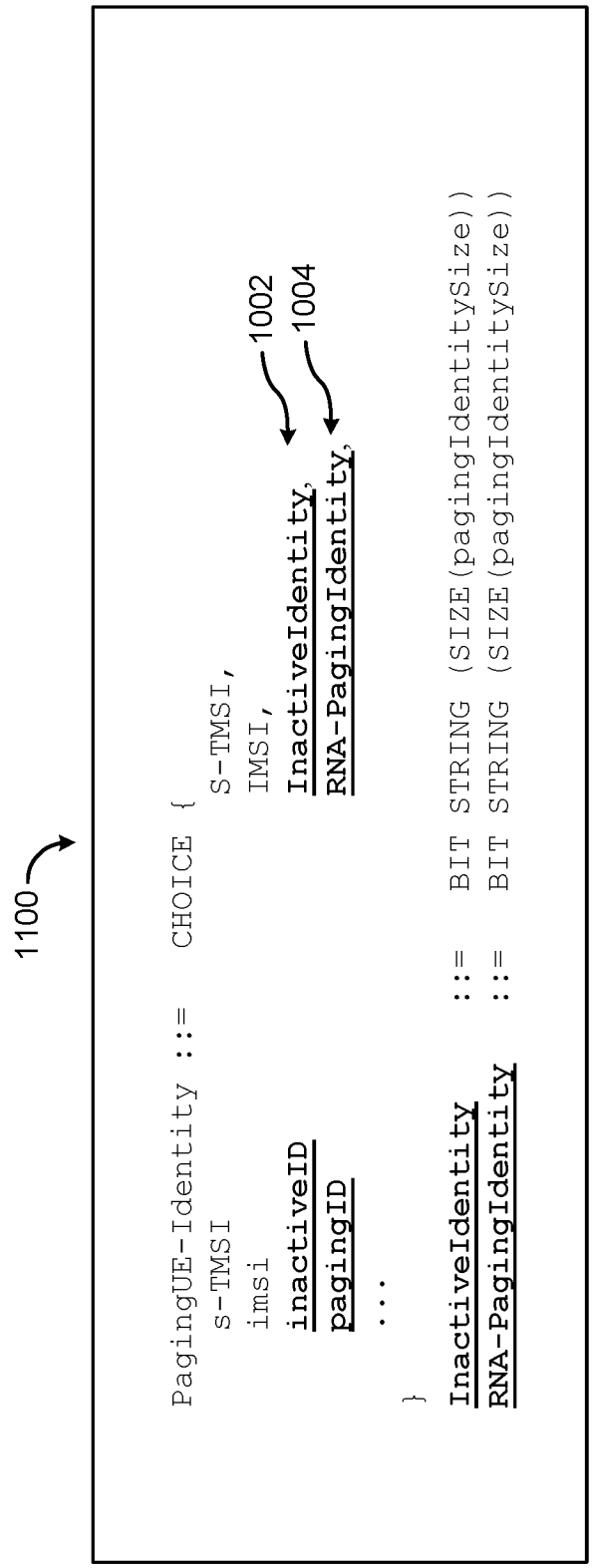
FIG. 11 illustrates an example PagingUE-Identity usable in the downlink transmission process of FIG. 9D.

Step 1b: [DL] Paging notification. The paging notification may be a paging message or other indication of the UE 212 being paged. For example, a paging message contains a list of paging records each of which identifies one of the UEs being sought. Note that this may require a new PagingUE-Identity to incorporate inactive mode UEIDs 1002 or other RNA-based paging identifiers 1004. FIG. 11 illustrates an example PagingUE-Identity 1100 that incorporates such information.

Figure 12:
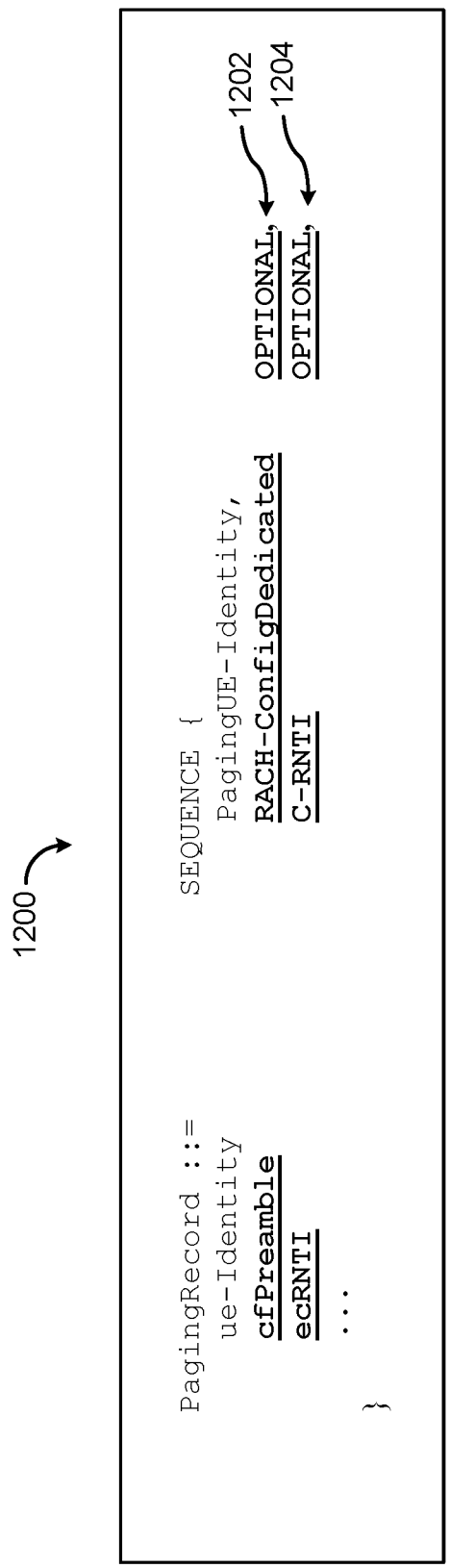
FIG. 12 illustrates an example paging record usable in the downlink transmission process of FIG. 9D.

In addition, the paging record includes a dedicated preamble 1202 to be used by the UE 212 in a subsequent random access transmission and may contain an ephemeral C-RNTI (eC-RNTI) 1204 that may be subsequently used to schedule transmissions between the UE 212 and serving node 506. FIG. 12 illustrates an example paging record 1200.

Step 1c: [UL] preamble. If the UE 212 determines that the PagingUE-Identity in a paging record matches one of the identifiers assigned to the UE 212, the UE 212 acknowledges receipt by initiating a contention-free random access procedure that uses the preamble defined in the dedicated RACH configuration (RACH-ConfigDedicated) of the paging record.

Step 1d: [DL] DCI (eC-RNTI, DL grant). If the serving RAN node 506 successfully receives the dedicated preamble, the serving node 506 transmits a DL grant using a DCI encoded with the eC-RNTI assigned to the UE 212 via the paging record in step 1b.

If the serving node 506 does not receive a response from the target UE 212 (e.g. a transmission error may have occurred or the UE 212 may be located outside the coverage area of the RAN node), it may repeat the paging procedure or (silently) abandon the delivery attempt.

Step 1e: [DL] RLC data PDU. The serving node 506 then transmits a downlink RLC PDU to the UE 212 containing the PDCP data PDU received from the anchor node 502.

Steps 2a,b: If the serving node 502 requested an RLC acknowledgement in step 1e or if the radio bearer RLC is configured for assured mode operation, a DCI containing an UL grant encoded with the eC-RNTI assigned to the UE 212 is provided for transmission of the RLC status report.
Downlink PDU at Serving RAN Node The downlink PDU transmitted by the RAN serving node 506 described above includes a MAC data element containing an RLC data PDU and may include zero or more MAC control elements, as shown in FIG. 13.

As may be seen in FIG. 13A the serving node 506 may provide zero or more MAC control elements as required for UE 212 operation at the serving RAN node 506 (e.g. for assignment of a new eC-RNTI, for timing advancement, for power control, etc). If a 4-step RACH is used for the downlink transmission procedure, the serving node 506 will also include a contention resolution MAC CE containing the UEID provided by the UE 212 in its second uplink transmission (i.e. step 1h of FIG. 9C includes the UEID provided in step 1f).

As may be seen in FIG. 13B, if the anchor node 502 provided one or more MAC control elements, these MAC CEs (e.g. containing a new UEID) may also be included by the serving node 506 in the downlink PDU.

As may be seen in FIG. 13C, the data contained in a MAC data element may include one or more of the following fields:
- a MAC element header 1302 indicating that this is a data element; this field also includes the logical channel identifier (LCID) provided by the anchor node 502.
- a length field 1304 indicating the number of octets within the MAC data element.
- a Radio Link Control (RLC) header 1306 provided by the serving node 506.
- the Packet Data Convergence Protocol (PDCP) data PDU 1308 provided by the anchor node 502.

Asynchronous HARQ Operation in Serving RAN Node

Asynchronous HARQ may be used for recovery from transmission errors whenever an eC-RNTI has been assigned to the UE 212 by the serving node 506:
- downlink delivery without paging (described above with reference to FIG. 9B) may use asynchronous HARQ to recover from transmission errors involving the delivery of the downlink PDU containing the PDCP data PDU (step 1b) and the delivery of the uplink RLC status report (step 2b).
- in paging with a 4-step RACH procedure (described above with reference to FIG. 9C), asynchronous HARQ could be used to recover from transmission errors involving uplink transmission of the UEID (step 1f), delivery of the downlink PDU containing the RLC data PDU (step 1h) and the delivery of the uplink RLC status report (step 2b).
- in paging with a contention-free RACH procedure (described above with reference to FIG. 9D), asynchronous HARQ could be used to recover from transmission errors involving the delivery of the downlink PDU containing the RLC data PDU (step 1e) and the delivery of the uplink RLC status report (step 2b).

The asynchronous HARQ procedures may be similar to those described in 3GPP TS 36.321, "Evolved Universal Terrestrial Radio Access Network (E-UTRAN); Medium Access Control (MAC) protocol specification" using DCIs encoded with the eC-RNTI assigned to the UE 212 by the serving node 506.
RLC Operation in Serving RAN Node Although HARQ may be used to recover from transmission errors between the UE 212 and serving node 506, the serving node 506 may optionally employ RLC ARQ in addition to, or in place of, HARQ.

Figures 14A, 14B:
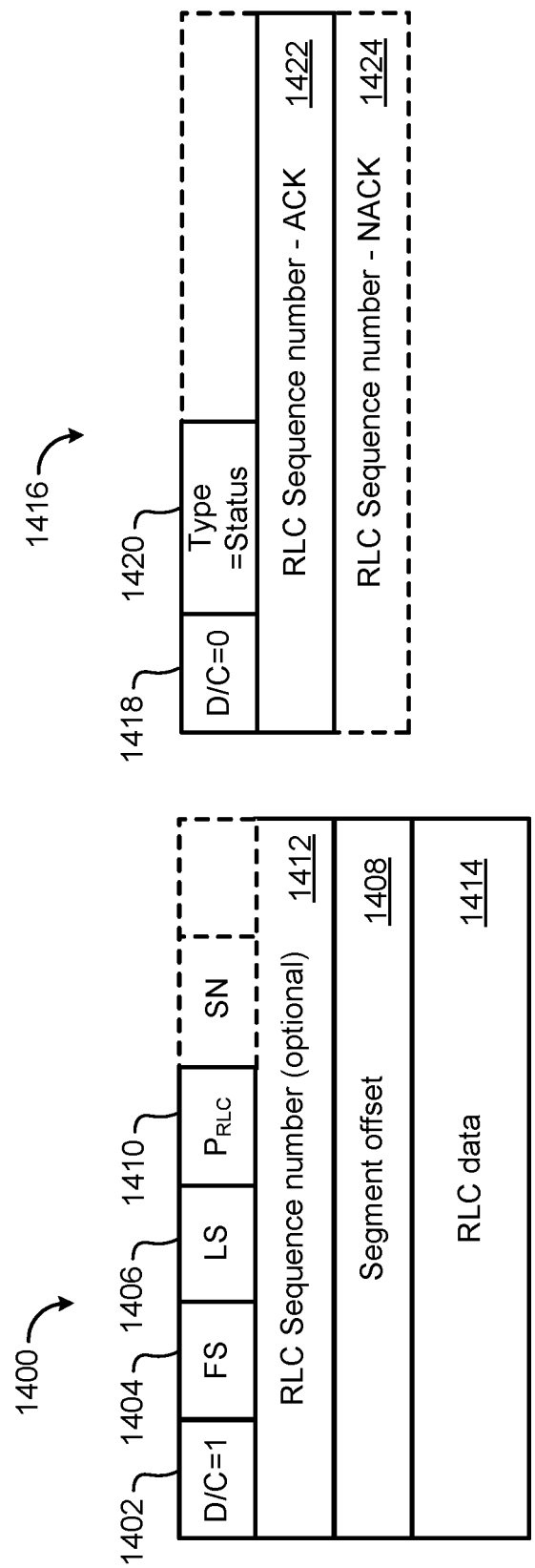
FIG. 14A illustrates an example RLC data PDU usable in embodiments of the present invention.
FIG. 14B illustrates an example RLC status PDU usable in embodiments of the present invention.

Referring to FIG. 14A, the RLC data PDU 1400 used to deliver the downlink PDCP data PDU to the UE 212 may include the following fields:
- a data/control flag 1402 indicating this is an RLC data PDU (e.g. D/C=1);

an indication of whether this is the first segment of an RLC PDU (e.g. an FS flag) 1404;

an indication of whether this is the last segment of an RLC PDU (e.g. an LS flag) 1406;

a segment offset field (e.g. SO) 1408 indicating the starting position of this segment within the RLC PDU. The segment offset field may not be required if this is the first segment of the RLC PDU (e.g. FS=1 and LS=0) or if the RLC PDU is not segmented (e.g. FS=1 and LS=1);

a poll flag (e.g. $P_{RLC}$) 1410 indicating whether the serving node 506 is requesting acknowledgement from the UE 212 that this PDU was received;

an RLC sequence number 1412 may be included but is not required. In some scenarios, the existence of an optional RLC sequence number may be indicated by a flag in the RLC header (e.g. SN=1);

an RLC data field 1414 containing the PDCP data PDU received from the anchor node 502.

Referring to FIG. 14B, if acknowledgement is requested (e.g. $P_{RLC}$=1) or if the radio bearer RLC is configured for assured mode operation, the RLC status report 1416 used by the UE 212 to deliver the uplink acknowledgement to the serving node 506 may contain the following fields:

a data/control flag 1418 indicating this is an RLC control PDU (e.g. D/C=0);

a type field 1420 indicating that this is an RLC status report;

a positively acknowledged (ACK) sequence number field 1422 containing the sequence number of the next expected RLC data PDU;

a negatively acknowledged (NACK) sequence number field 1424 containing the sequence number of a lost RLC data PDU. This field may be optional.

Reporting Delivery Status by Serving RAN Node

As indicated above, the anchor RAN node 502 may include a delivery option indicating whether the target RAN node 508 should provide a delivery status report to the anchor RAN node 502. A delivery status report may be requested by the anchor node 502 for one or more of the following:

successful delivery, indicating that the PDCP PDU was successfully delivered by the serving RAN node 506 to the UE 212 using an assured mode (AM) RLC procedure. Note, however, that this does not indicate successful processing of the received PDCP PDU by the UE 212; this can only be indicated by a separate PDCP status report from the UE 212.

unsuccessful delivery (no page response received), indicating that the UE 212 did not respond to a paging notification initiated by the target RAN node 508. This may be used, for example, by the anchor node 502 to ensure delivery of a paging request to a target RAN node 508 or to reduce the delay in initiating recovery from RAN paging failure.

unsuccessful delivery (page response received), indicating that the UE 212 did respond to a paging notification initiated by the target RAN node 508 but a subsequent RLC assured mode (AM) attempt to transmit the downlink PDU to the UE 212 failed. This may be used, for example, by the anchor node 502 to determine the reachability of a UE 212 even if the UE 212 is moving or is operating in a region with poor coverage.

delivery attempted (page response received), indicating that the UE 212 did respond to a paging notification initiated by the target RAN node 508 and that a subsequent RLC un-assured mode (UM) attempt to transmit the downlink PDU to the UE 212 was completed. This may be used, for example, by the anchor node 502 to determine the reachability of a UE 212 when delivering UM data.

Figure 15:
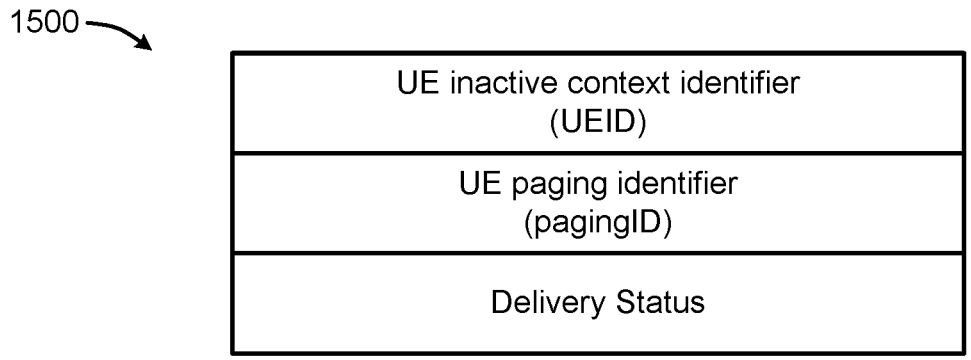
FIG. 15 illustrates an example Rn delivery status PDU usable in embodiments of the present invention.

If the delivery status report requested by the anchor node 502 matches the results at the target RAN node 508, the target node 508 may construct an Rn PDU and forward it to the anchor RAN node 502. FIG. 15 illustrates an example Rn Delivery Status PDU 1500 usable for this purpose.

Operations at the UE

In all cases, following a successful downlink reception of the RLC data PDU by the target UE 212, the UE 212 has received the PDCP data PDU provided by the anchor node 502.

Downlink Data Packet Reconstruction

Using the LCID selected by the anchor RAN node 502 and contained in the LCID field of the MAC data element (FIG. 13C), the UE 212 can retrieve the context associated with this radio bearer (DRB or SRB). In particular, the UE 212 obtains:

the cryptographic parameters currently associated with the radio bearer (e.g. cryptographic keys and algorithms);

RRC configuration parameters associated with the radio bearer;

the PDCP sequence number window currently associated with the radio bearer.

The UE 212 may then proceed as follows:

Step 1: If the PDCP sequence number is not valid, the UE 212 discards the received PDU and terminates the current procedure.

Step 2: If the radio bearer has been configured for user plane encryption, the UE 212 decrypts the PDCP data using the configured cryptographic parameters and the PDCP sequence number received with the PDU.

Step 3: If the radio bearer has been configured to include a message integrity check, the UE 212 verifies that a message integrity check has been included and that it is valid. If the message integrity check fails, the UE 212 discards the received PDU and terminates the current procedure.

Step 4: If the radio bearer has been configured for robust header compression, the UE 212 decompresses the header contained in the (decrypted) PDCP data using the current state of the header compression stream.

Step 5: If the UE 212 can reconstruct a valid data packet, it determines whether the data packet can be processed at this time:

if in-order delivery of PDCP PDUs has been disabled for the LCID, the UE 212 immediately delivers the data packet to upper layers for processing.

otherwise, since in-order delivery is enabled for the LCID, the UE 212 buffers the received data packet and initiates in-order delivery procedures.

Acknowledgement of Downlink Data Packet Reception

If a PDCP status report was requested by the anchor RAN node 502 (e.g. $P_{PDCP}$=1) or if the radio bearer is configured to provide PDCP reception status, the UE 212 may initiate a new uplink data transmission to transmit the reception status either using uplink transmission opportunities granted through its eC-RNTI (if assigned) or using an inactive uplink transmission procedure. Note that it is not necessary for the UE 212 to immediately acknowledge receipt of the downlink PDCP data PDU. The UE 212 may, for example, delay acknowledgement until it either has an uplink user data packet queued for transmission or until a pre-configured timer expires. In this case, all PDCP data PDUs successfully received and processed by the UE 212 should be acknowledged in the PDCP status report.

Figure 16A:
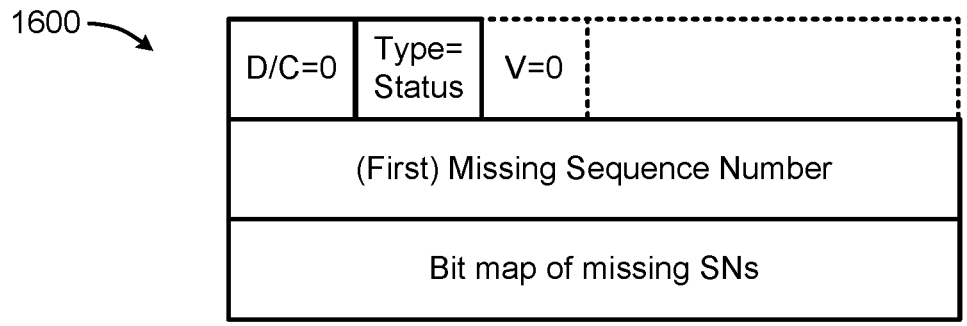
FIGS. 16A and 16B illustrate respective example PDCP status PDUs usable in embodiments of the present invention.

Referring to FIG. 16A, the PDCP status report PDU 1600 constructed by the UE 212 preferably includes the status of all PDCP PDUs received by the UE 212 since at least the last status report transmitted to the anchor RAN node 502. Any PDCP PDU that failed an integrity check may also be marked as "not received".

Figure 16B:
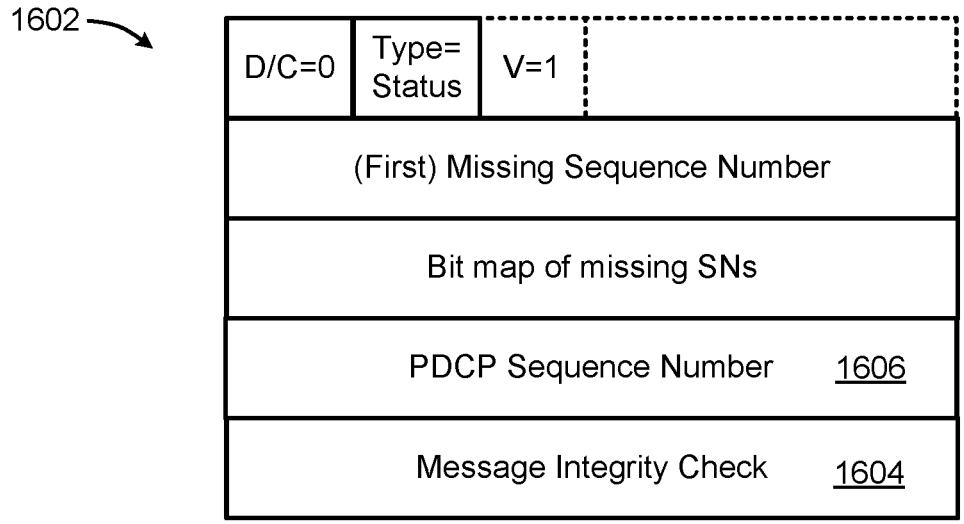

In some situations, the PDCP status PDU 1602 may include a message integrity check 1604, as shown in FIG. 16B. This may be used, for example, as protection against transmission errors and as protection against man-in-the-middle attacks. In this case, the PDCP status PDU 1602 may include the PDCP sequence number 1606 copied from the corresponding PDCP data PDU and a message integrity check 1604 computed over the PDCP status PDU using the configured cryptographic parameters.

The message integrity check may be included due to RRC configuration or due to an explicit request from the anchor RAN node. If authentication is required, the UE 212 constructs a PDCP status PDU with an integrity check (FIG. 16B); otherwise, the UE 212 may construct a PDCP status PDU without an integrity check (FIG. 16A). The presence of an optional message integrity change may be indicated by a validation flag (e.g. V=1) in the header of the PDCP status PDU.

Based on the foregoing description, it may be appreciated that embodiments of the present invention provide any one or more of the following features.

A method at a network node of a radio access network (RAN) for delivering downlink data to a user equipment (UE) operating in an inactive mode, the method comprising:
    receiving, via a network interface of the network node, the downlink data destined to the UE;
    retrieving stored UE context information and an inactive mode identifier associated with the UE;
    constructing a downlink protocol data unit (PDU) using the stored UE context information, the downlink PDU including the received downlink data;
    identifying one or more target nodes using the stored UE context information; and
    transmitting, via the network interface, the inactive mode identifier and the downlink PDU to the identified one or more target nodes to cause at least one of the identified one or more target nodes to transmit the downlink PDU to the UE.

In some embodiments, each target node in the set of target nodes is configured to control communication within at least one cell of the RAN.

In some embodiments, identifying the set of one or more target nodes comprises:
    identifying cells of the RAN in which the UE may be located, based on the stored UE context information; and
    selecting nodes of the RAN configured to control communication within the identified cells as target nodes.

In some embodiments, the stored UE context information associated with the UE comprises information identifying a RAN notification area associated with the UE, and wherein identifying the set of one or more target nodes comprises selecting nodes of the RAN configured to control communication within the identified RAN notification area as target nodes.

In some embodiments, the stored UE context information comprises cryptographic keys, and wherein transmitting the downlink PDU to the identified set of target nodes comprises:
    cryptographically securing the downlink PDU based on the cryptographic keys; and
    transmitting the cryptographically secured downlink PDU to the identified set of target nodes.

In some embodiments, cryptographically securing the downlink PDU comprises either one or both of: encrypting the downlink PDU, and computing a message integrity check value.

In some embodiments, transmitting the downlink data PDU to the identified one or more target nodes further comprises transmitting delivery instructions to the identified one or more target nodes.

In some embodiments, the delivery instructions comprises a user device paging identifier associated with the UE, and wherein instructing each target node to transmit the downlink PDU to the UE comprises instructing each target node to:
    transmit, in a first downlink transmission, a downlink transmission notification comprising one or more of: the inactive mode identifier, the user device paging identifier, and an ephemeral device identifier associated with the UE;
    receive, in a first uplink transmission, a preamble associated with the UE; and
    transmit, in a second downlink transmission, the downlink PDU in association with the ephemeral device identifier.

A network function comprising:
    a network interface configured to receive data from and transmit data to other network functions connected to a network;
    one or more processors; and
    at least one non-transient computer readable memory storing software instructions configured to control the one or more processors to deliver downlink data to a user equipment (UE) operating in an inactive mode, by:
        receiving, via the network interface, the downlink data destined for the UE;
        retrieving stored UE context information and an inactive mode identifier associated with the UE;
        constructing a downlink protocol data unit (PDU) using the stored UE context information, the downlink PDU including the received downlink data;
        identifying one or more target nodes using the stored UE context information; and
        transmitting the inactive mode identifier and the downlink PDU to the identified one or more target nodes, to cause at least one of the identified one or more target nodes to transmit the downlink PDU to the UE.

A network function comprising:
    a network interface configured to receive data from and transmit data to other network functions connected to a network;
    one or more processors;
    a radio receiver configured to receive data through a radio link;
    a radio transmitter configured to transmit data through the radio link; and
    at least one non-transient computer readable memory storing software instructions configured to control the one or more processors to deliver downlink data to a user equipment (UE) operating in an inactive mode, by:
        receiving, via the network interface, a data delivery request comprising a downlink PDU, the downlink PDU including the downlink data, and delivery instructions including one or more of: an inactive mode identifier associated with the UE and a user device paging identifier associated with the UE;

transmitting via the radio transmitter a downlink transmission notification comprising one or more of: the inactive mode identifier, the user device paging identifier, and an ephemeral device identifier associated with the user device identifier;

receiving via the radio receiver a preamble associated with the UE; and transmitting via the radio transmitter the downlink PDU in association with the ephemeral device identifier.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method comprising:

at a network node of a radio access network (RAN):

receiving downlink data destined to a user equipment (UE) operating in an inactive mode;

retrieving stored UE context information and an inactive mode identifier associated with the UE operating in the inactive mode;

generating an intra-RAN protocol data unit (PDU) comprising a downlink Packet Data Convergence Protocol (PDCP) data PDU constructed using the stored UE context information, the inactive mode identifier associated with the UE, and UE notification information comprising: at least one of a user device paging identifier associated with the UE and a UE discontinuous reception (DRX) configuration, wherein the constructed downlink PDCP data PDU comprises the downlink data destined to the UE operating in the inactive mode;

identifying a plurality of target nodes of the RAN using the stored UE context information; and transmitting the intra-RAN PDU to all of the identified target nodes, wherein one of the plurality of target nodes is a serving node currently serving the UE operating in the inactive mode;

at the serving node:

receiving the downlink intra-RAN PDU;

transmitting a downlink transmission notification indicating a pending downlink PDU transmission using the UE notification information included in the intra-RAN PDU, the downlink transmission notification one of: the inactive mode identifier, and the user device paging identifier associated with the UE; and;

in response to receipt of a response from the UE operating in the inactive mode, transmitting a radio link control (RLC) PDU containing the downlink PDCP data PDU.

2. The method as claimed in claim 1, wherein each one of the identified target nodes is configured to control communication within at least one cell of the RAN.

3. The method as claimed in claim 2, wherein identifying the plurality of target nodes comprises:

identifying cells of the RAN in which the UE may be located, based on the stored UE context information; and selecting nodes of the RAN configured to control communication within the identified cells as the target nodes.

4. The method as claimed in claim 2, wherein the stored UE context information comprises information identifying a RAN notification area associated with the UE.

5. The method as claimed in claim 4, wherein identifying the plurality of target nodes comprises selecting nodes of the RAN configured to control communication within the identified RAN notification area as the target nodes.

6. The method as claimed in claim 1, wherein the stored UE context information comprises at least one cryptographic key, and wherein the downlink PDCP data PDU is constructed by cryptographically securing the received downlink data using the at least one cryptographic key.

7. The method as claimed in claim 6, wherein cryptographically securing the received downlink data comprises either one or both of: encrypting the received downlink data using the at least one cryptographic key; and computing a message integrity check value using the received downlink data and the at least one cryptographic key.

8. The method as claimed in claim 1, wherein at the serving node, the downlink transmission notification indicating a pending downlink PDU transmission comprising one or more of: the inactive mode identifier, a preamble identifier, and an ephemeral device identifier associated with the UE.

9. The method as claimed in claim 8, wherein the downlink transmission notification indicating a pending downlink PDU transmission comprises the preamble identifier, and wherein the response received from the UE operating in the inactive mode comprises:

a preamble associated with the preamble identifier.

10. The method as claimed in claim 8, wherein the downlink transmission notification indicating a pending downlink PDU transmission comprises the ephemeral device identifier, and wherein at the serving node, transmitting a RLC PDU further comprises transmit the RLC PDU containing the downlink PDCP data PDU in association with the ephemeral device identifier.

11. The method as claimed in claim 1, wherein the UE notification information comprises both the user device paging identifier associated with the UE and the UE DRX configuration, and wherein the downlink transmission notification indicating a pending downlink PDU transmission comprises the user device paging identifier, and wherein, the downlink transmission notification is transmitted using the DRX configuration.

12. The method as claimed in claim 1, wherein the downlink intra-RAN PDU further comprises delivery status instructions identifying one or more conditions to cause at least one of the identified target nodes to transmit a delivery status report to the network node, the conditions including one or more of: successful delivery of the downlink PDCP data PDU; no response to the downlink transmission notification; failure of transmission of the RLC PDU over a radio link to the UE; and transmission of the RLC PDU attempted over a radio link to the UE.

13. The method of claim 1, wherein generating the intra-RAN PDU further comprises incorporating an indication into the downlink PDCP data PDU to cause the UE to transmit an acknowledgement to the network node.

14. A network node of a radio access network (RAN), the network node comprising:

a first network interface;

a second network interface;

at least one processor; and a memory storing instructions that when executed by the at least one processor cause the network node to:
  receive, via the first network interface, downlink data destined for a user equipment (UE) operating in an inactive mode;
  retrieve stored UE context information and an inactive mode identifier associated with the UE operating in the inactive mode;
  generate an intra-RAN protocol data unit (PDU) comprising a downlink Packet Data Convergence Protocol (PDCP) data PDU constructed using the stored UE context information, the inactive mode identifier associated with the UE operating in the inactive mode, and UE notification information comprising: at least one of a user device paging identifier associated with the UE and a UE discontinuous reception (DRX) configuration, wherein the constructed PDCP data PDU comprises the downlink data destined to the UE operating in the inactive mode;
  identify a plurality of target nodes of the RAN using the stored UE context information; and
  transmit, using the second network interface, the intra-RAN PDU to all of the identified target nodes, wherein one of the plurality of target nodes is a serving node currently serving the UE operating in the inactive mode.

15. The network node as claimed in claim 14, wherein each one of the identified target nodes is configured to control communication within at least one cell of the RAN.

16. The network node as claimed in claim 14, wherein the plurality of target nodes are identified by:
  identifying cells of the RAN in which the UE may be located, based on the stored UE context information; and
  selecting nodes of the RAN configured to control communication within the identified cells as the target nodes.

17. The network node as claimed in claim 14, wherein the stored UE context information comprises information identifying a RAN notification area associated with the UE.

18. The network node as claimed in claim 17, wherein identifying the plurality of target nodes comprises selecting nodes of the RAN configured to control communication within the identified RAN notification area as the target nodes.

19. The network node as claimed in claim 14, wherein the stored UE context information comprises at least one cryptographic key, and wherein the downlink PDCP data PDU is constructed by cryptographically securing the received downlink data using the at least one cryptographic key.

* * * * *

UNITED STATES PATENT AND TRADEMARK OFFICE
CERTIFICATE OF CORRECTION

PATENT NO. : 10,820,192 B2
APPLICATION NO. : 15/986070
DATED : October 27, 2020
INVENTOR(S) : William Anthony Gage Page 1 of 1

It is certified that error appears in the above-identified patent and that said Letters Patent is hereby corrected as shown below:

In the Specification

Column 15, Line 24, "USD" should read --UEID--

Column 16, Line 5, "USD" should read --UEID--

Signed and Sealed this
Fifteenth Day of December, 2020

Andrei Iancu
*Director of the United States Patent and Trademark Office*